United States Patent
Zhu et al.

(10) Patent No.: US 12,550,045 B2
(45) Date of Patent: Feb. 10, 2026

(54) OPTICAL REFERENCE SIGNAL BASED TRP DETECTION

(71) Applicant: QUALCOMM Incorporated, San Diego, CA (US)

(72) Inventors: Xipeng Zhu, San Diego, CA (US); Fei Huang, San Diego, CA (US); Duo Zhang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 17/658,613

(22) Filed: Apr. 8, 2022

(65) Prior Publication Data
US 2023/0328630 A1   Oct. 12, 2023

(51) Int. Cl.
*H04W 48/08* (2009.01)
*H04W 48/04* (2009.01)

(52) U.S. Cl.
CPC .......... *H04W 48/08* (2013.01); *H04W 48/04* (2013.01)

(58) Field of Classification Search
CPC ............................... H04W 48/04; Y02D 30/70
USPC ..................................................... 455/435.1
See application file for complete search history.

(56) References Cited

U.S. PATENT DOCUMENTS

| | | | |
|---|---|---|---|
| 2013/0221090 A1* | 8/2013 | Hensel | G06K 19/06046 235/375 |
| 2018/0048442 A1* | 2/2018 | Sang | H04B 7/0695 |
| 2018/0091212 A1* | 3/2018 | Lee | H04B 7/0695 |
| 2018/0181786 A1* | 6/2018 | Gao | G06K 7/1413 |
| 2019/0141262 A1* | 5/2019 | Labudovic | G08G 5/54 |
| 2020/0029237 A1* | 1/2020 | Kim | H04W 24/10 |
| 2022/0321175 A1* | 10/2022 | Tosato | H04L 1/0026 |
| 2023/0266425 A1* | 8/2023 | Sandgren | H04W 64/00 342/451 |

* cited by examiner

*Primary Examiner* — Fabricio R Murillo Garcia
(74) *Attorney, Agent, or Firm* — Procopio, Cory, Hargreaves & Savitch LLP

(57) ABSTRACT

The user equipment (UE) may obtain at least one optical reference signal associated with a transmit receive point (TRP), the at least one optical reference signal including at least one of: a TRP identifier (ID) or direction information of the at least one optical reference signal with reference to the TRP. The UE may identify information associated with the TRP with reference to the UE based on the at least one optical reference signal, and perform at least one of a cell acquisition, a beam management, a UE position detection, a TRP validation, or an ambient environment detection based on the identified information associated with the TRP. The UE may also receive at least one reference radio signal, and use the correlation between the optical reference signal and the received reference radio signal.

30 Claims, 13 Drawing Sheets

OPTICAL REFERENCE SIGNAL BASED TRP DETECTION

TECHNICAL FIELD

The present disclosure relates generally to communication systems, and more particularly, to a method of wireless communication including an optical reference signal based a transmit receive point (TRP) detection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a transmit receive point (TRP) (also referred to as a transmission-reception point) or a user equipment (UE). The TRP may transmit, for at least one UE, at least one optical reference signal including at least one of: a TRP identifier (ID) or direction information of the at least one optical reference signal with reference to the TRP and receive information associated with the TRP with reference the at least one UE based on the at least one optical reference signal. The UE may obtain at least one optical reference signal associated with the TRP, the at least one optical reference signal including at least one of: the TRP ID or direction information of the at least one optical reference signal with reference to the TRP, and identify information associated with the TRP with reference to the UE based on the at least one optical reference signal. The UE may also receive at least one reference radio signal, and use the correlation between the optical reference signal and the received reference radio signal.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
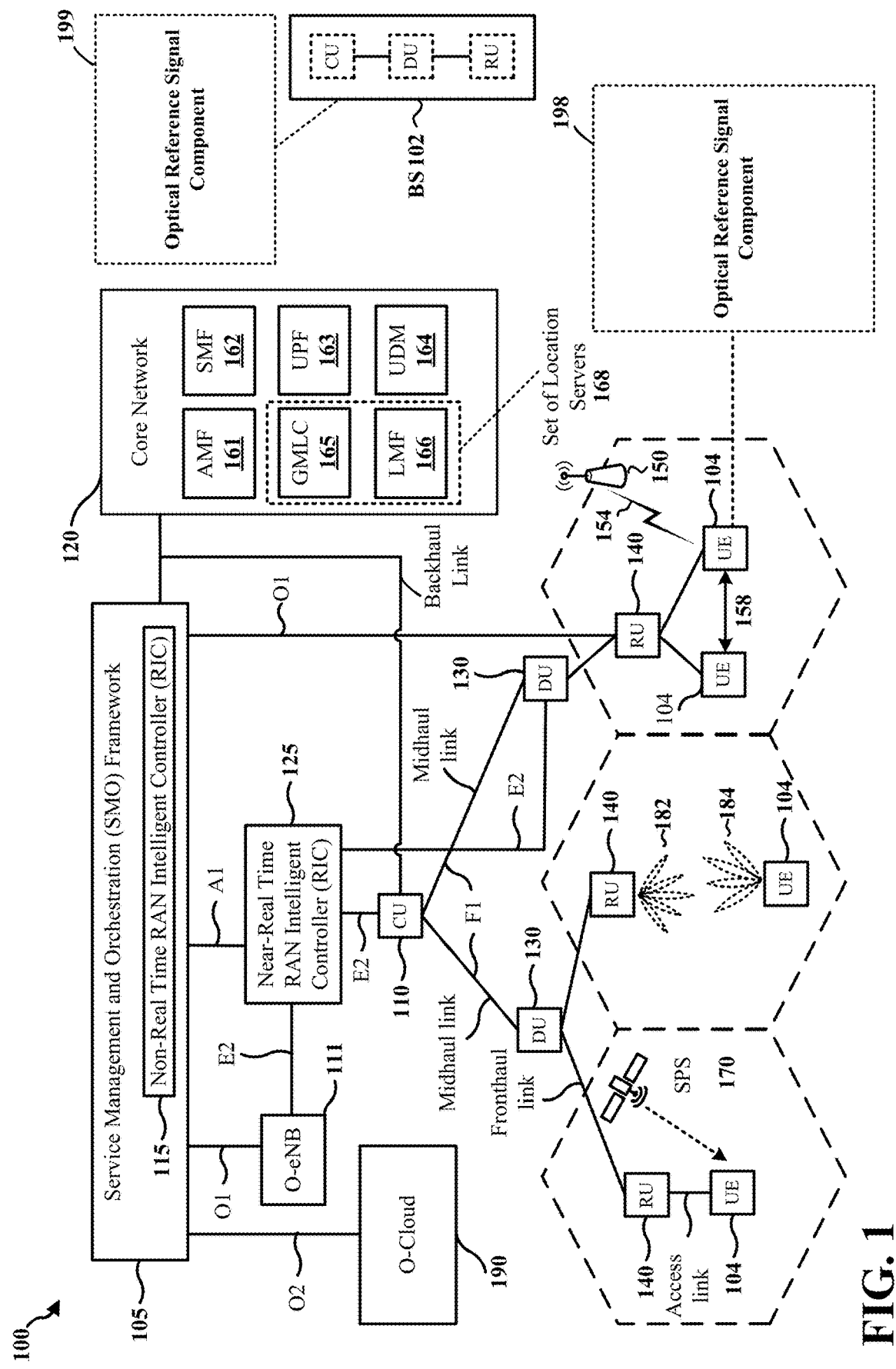
FIG. 1 is a diagram illustrating an example of a wireless communications system and an access network.

A TRP may broadcast at least one optical reference signal, and the UE may obtain the at least one optical reference signal using an image capturing device to identify certain information of the TRP and perform various functions, such as TRP detection, UE position detection, fast cell acquisition, beam detection, TRP validation, or radio transmission impacting factor generation.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit receive point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an optical reference signal component 198 configured to obtain at least one optical reference signal associated with a TRP, the at least one optical reference signal including at least one of: a TRP ID or direction information of the at least one optical reference signal with reference to the TRP, and identify information associated with the TRP with reference to the UE based on the at least one optical reference signal. In certain aspects, the base station 102 may include an optical reference signal component 199 configured to transmit, for at least one UE, at least one optical reference signal including at least one of: a TRP ID or direction information of the at least one optical reference signal with reference to the TRP, and receive information associated with the TRP with reference the at least one UE based on the at least one optical reference signal. Although the following description may be focused on 5G NR, the concepts described herein may be applicable to other similar areas, such as LTE, LTE-A, CDMA, GSM, and other wireless technologies.

Figure 2:
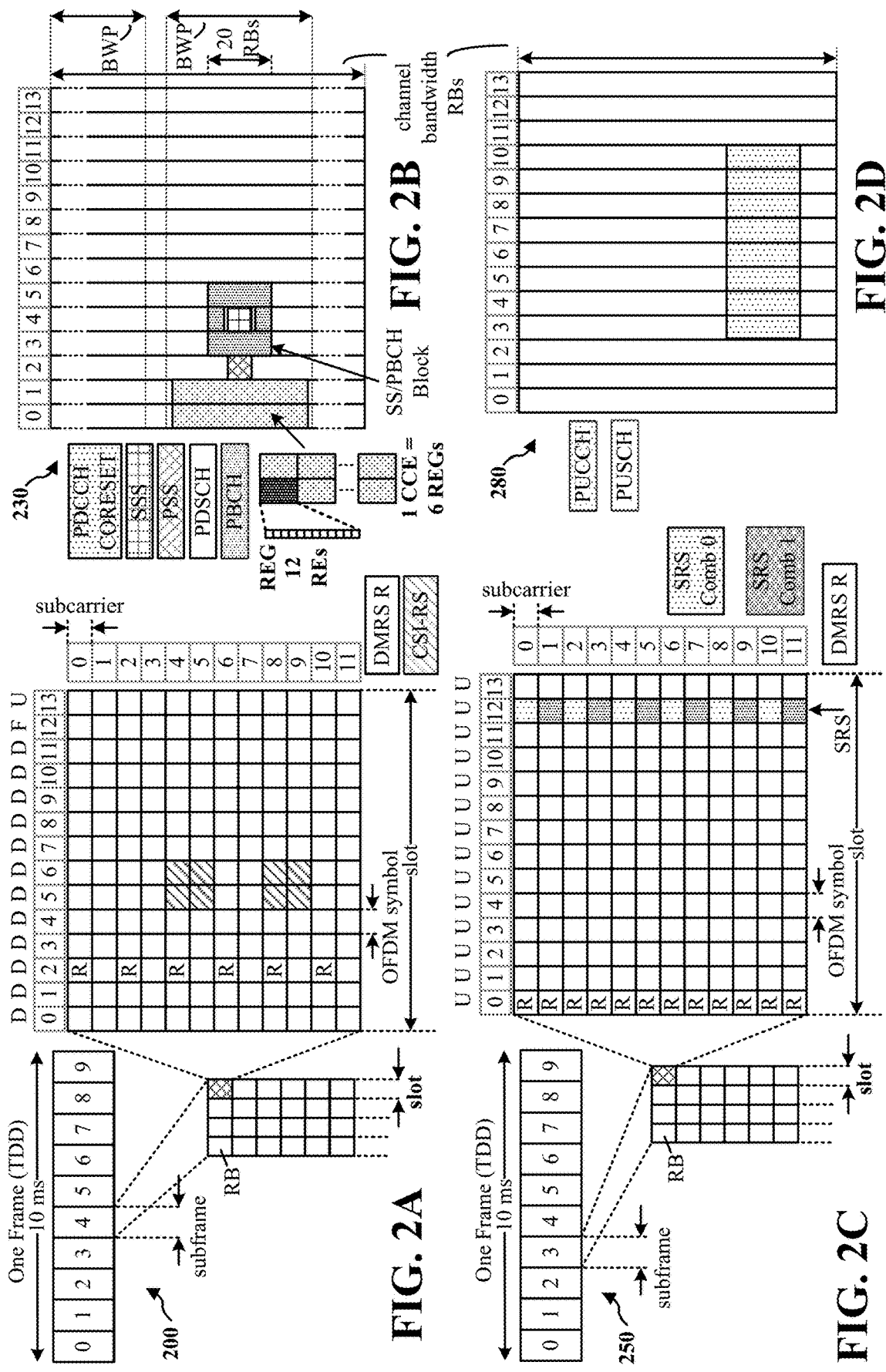
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
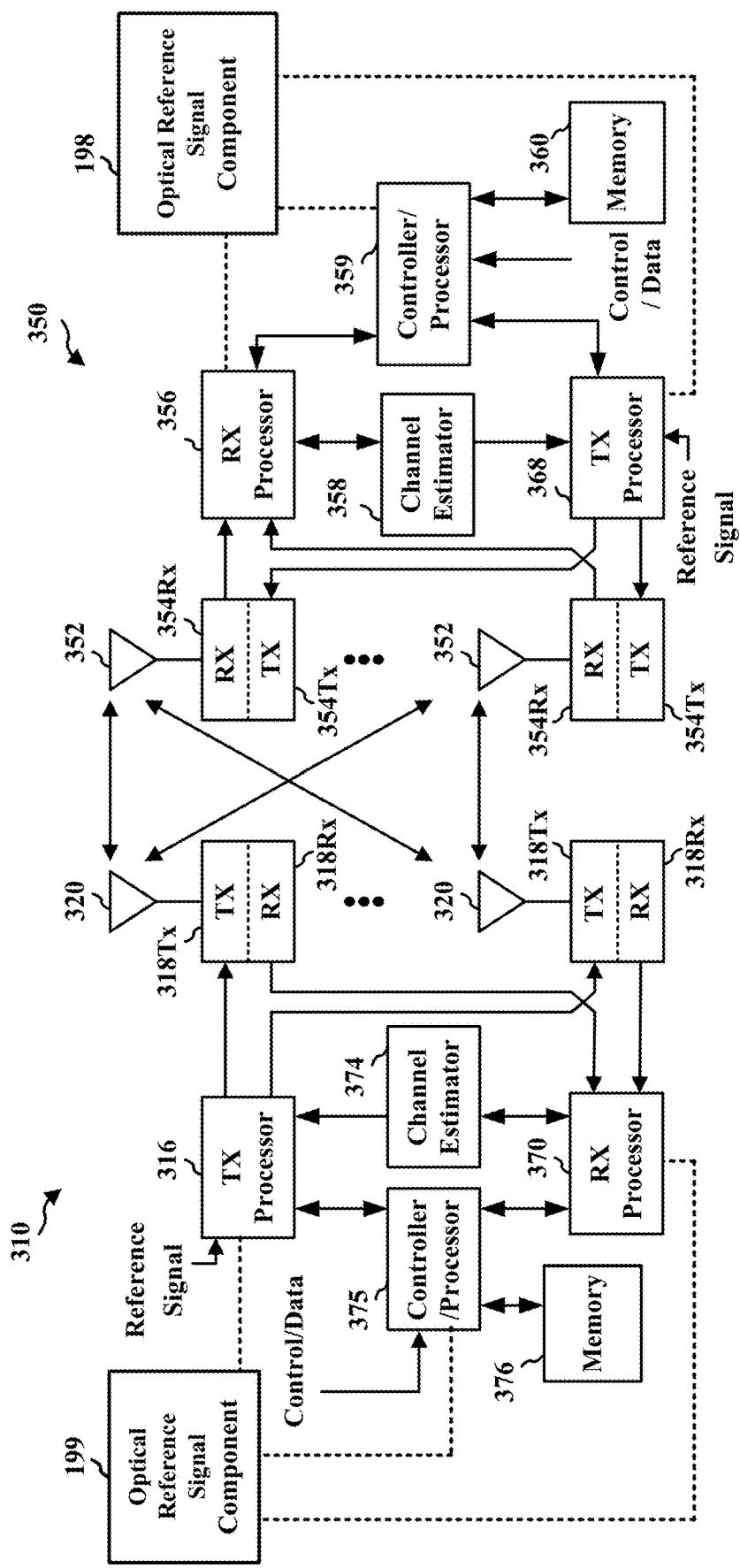
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the optical reference signal component 198 of FIG. 1. At least one of the TX processor 316, the RX processor 370, and the controller/processor 375 may be configured to perform aspects in connection with the optical reference signal component 199 of FIG. 1.

Figure 4:
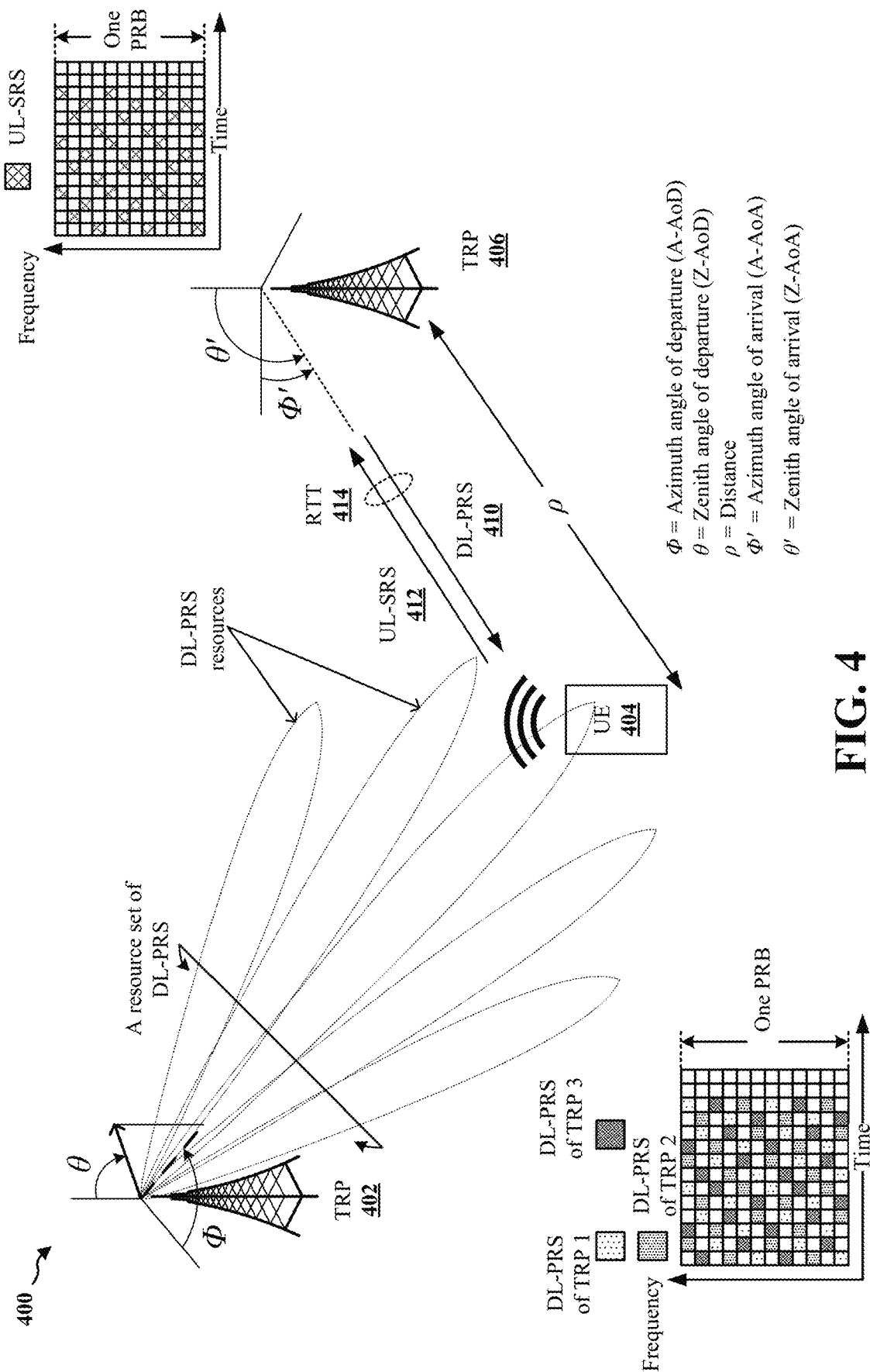
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX} - T_{PRS\_TX}\| - |T_{SRS\_TX} - T_{PRS\_RX}\|$. Accordingly, multi-RTT positioning may make use of the UE Rx-Tx time difference measurements (i.e., $|T_{SRS\_TX} - T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX} - T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Figure 5:
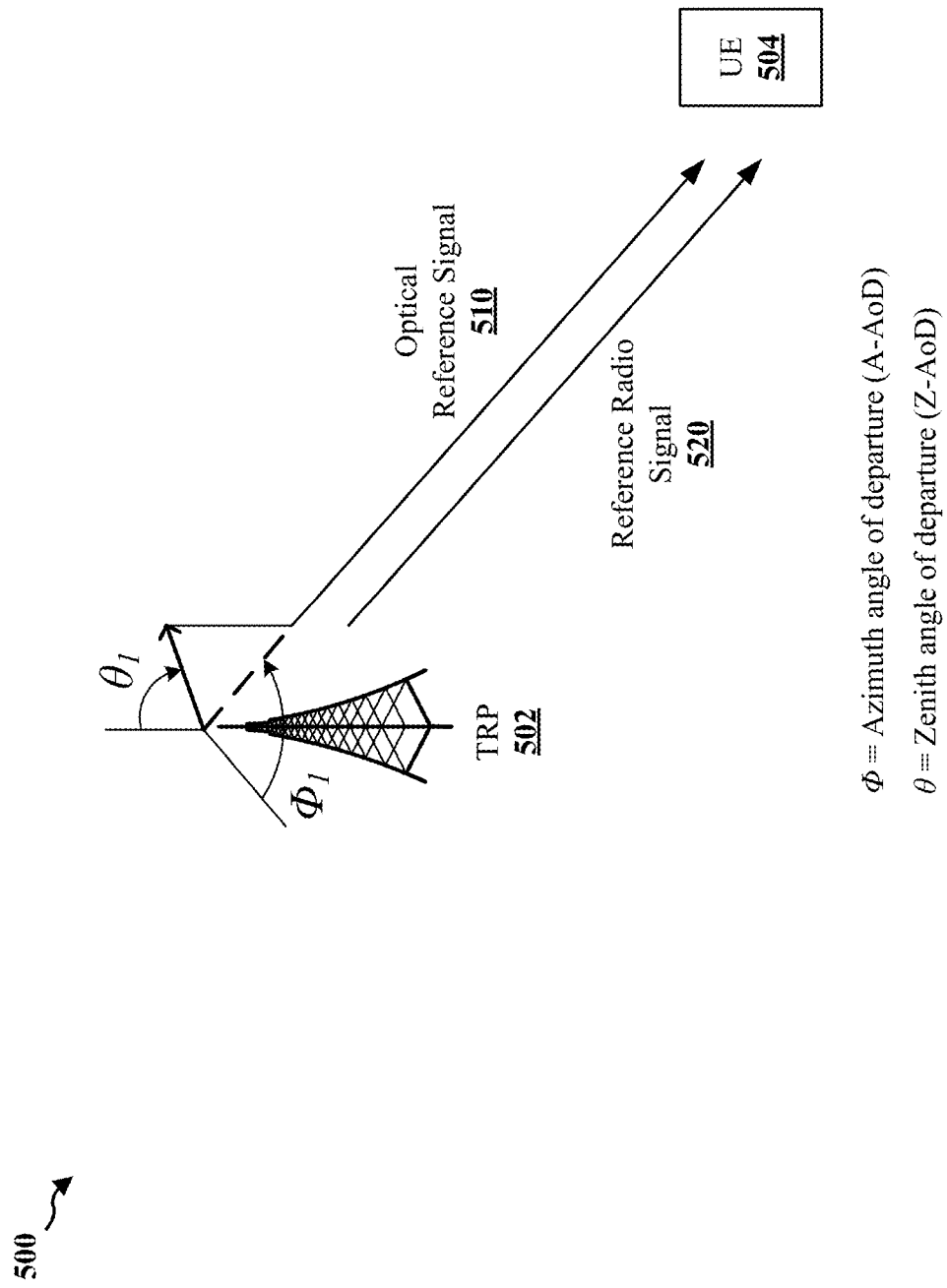
FIG. 5 is a diagram illustrating an example of providing optical reference signal.

FIG. 5 is a diagram 500 illustrating an example of providing optical reference signal. The diagram 500 includes a TRP 502 and a UE 504. The TRP 502 and the UE 504 configured with millimeter wave (mmW or mmWave) frequency bands, e.g., above or equal to 24 GHz, may be configured to support the UE positioning and the beam management. In some aspects, to provide the UE positioning, the UE 504 may detect at least one TRP 502, e.g., gNB, base station, or network node, using its camera. That is, the TRP 502 may broadcast at least one optical reference signal 510, and the UE 504 may obtain the at least one optical reference signal 510 using an image capturing device, e.g., camera. The UE 504 may identify information of the TRP 502 based on the at least one optical reference obtained from the TRP 502. For example, the information may include a channel state information (CSI) measurement, positioning information, or a mobility information.

To accommodate the UE 504 to identify information, the TRP 502 may transmit or broadcast the optical reference signal 510 similar to the SSB or the MIB in radio wireless communication. Here, the reference signaling may include at least one of TRP ID or Cell ID information, or direction information, e.g., where the UE 504 is in spatial direction of the TRP 502.

In some aspects, the UE 504 may receive the optical reference signal 510 and a reference radio signal 520, and correlate the received radio signal and optical reference signal 510. For example, the optical reference signal 510 and the reference radio signal 520 may be used for two-stage beam management, fast cell acquisition, positioning, or TRP 502 authentication. Furthermore, the UE 504 may use the detected video/optical information for other purposes, e.g., weather prediction or pollution prediction.

The optical reference signal 510 may include information of the TRP 502, and the TRP 502 may broadcast the information of the TRP 502 using the optical reference signal 510. In one aspect, the optical reference signal 510 may include information of the TRP ID. The TRP ID may represent the identity or location of the TRP 502, and the UE 504 may identify the TRP 502 based on the TRP ID retrieved from the optical reference signal 510. Analogous to the physical cell ID (PCI), the TRP ID may be configured to be unique within a certain physical area, but the TRP ID may not be unique in the network.

In another aspect, the optical reference signal 510 may include direction and/or angle information associated with the optical reference signal 510. That is, the optical reference signal 510 may be broadcasted at a certain direction and/or angle with reference to the TRP 502 or the antenna, and the optical reference signal 510 may indicate the direction and/or angle of the optical reference signal 510 to which the optical reference signal 510 is broadcasted. The UE 504 may retrieve the direction and/or angle of the optical reference signal 510 from the optical reference signal 510, and perform a positioning procedure based on the direction and/or angle of the optical reference signal 510.

A source of optical reference signal 510 may include at least one of an infrared LED, a laser outside the visible light frequency range, or a visible light. That is, the TRP 502 may include a light source to provide the optical reference signal 510, and the light source may include at least one of an infrared LED, a laser outside the visible light frequency range, or a visible light. The infrared LED may have a low cost, low power consumption, and not visible for the other people to easily discovering the TRP 502.

The optical reference signal 510 may include an identifier (ID) of the TRP 502. That is, the TRP 502 may generate the optical reference signal 510 to include the TRP ID. In some aspects, the TRP 502 may modulate the TRP ID may to the optical reference signal 510, and the UE 504 may demodulate the optical reference signal 510 to retrieve the TRP ID associated with the optical reference signal 510. The ID of the TRP 502 may be modulated using various modulation methods.

In one aspect, the optical reference signal 510 may include a set of binary light signals (on or off), and the TRP ID may be modulated by indicating a binary value of the TRP ID using the set of light signals. For example, the optical reference signal 510 may include eight (8) light signals from eight LED light sources, which may carry 8-bit TRP ID information. In one example, the 8-bit TRP ID information may indicate the TRP ID. In another example, the 8-bit TRP ID information may indicate an index value of a database of TRP ID, the index value being associated with the TRP ID. The database of the TRP ID may be shared between the TRP 502 and the UE 504. The UE 504 may query an external database from the network. In another aspect, the optical reference signal 510 may include a set of colored light signals, each of the colored light signals may be configured to carry 2-bit information. For example, the colored light signals may be RBG signals (red, green, blue, or off). In another aspect, the optical reference signal 510 may include visible light communication (VLC) style digital modulation. For example, the TRP ID may be modulated to a single light source through the VLC style modulation, e.g., pulse amplitude modulation (PAM), on-off keying (OOK) modulation, Pulse position modulation (PPM), pulse width modulation (PWM) or orthogonal frequency division multiplexing (OFDM). Based on the VLC style digital modulation, each cycle may carry multiple bits of information.

In some aspects, the lights, e.g., a plurality of optical reference signals, from the TRP 502 may be cast in different directions for the UE 504 to detect the direction and/or angle of the TRP 502 with reference to the UE 504. That is, the TRP 502 may be configured to broadcast each of the plurality of optical reference signals in different directions, and the UE 504 may obtain at least a subset of optical reference signals from the plurality of the optical reference signals to detect the direction and/or the angle of the TRP 502 with reference to the UE 504. Accordingly, the UE 504 may also detect the direction and/or the angle of the UE 504 with reference to the UE 504.

The TRP 502 may cast or transmit each of the plurality of optical reference signals in different directions, and the UE 504 may obtain at least the subset of optical reference signals from the plurality of the optical reference signals. That is, the subset of optical reference signals may be cast in directions that the UE 504 may detect the subset of optical reference signals. Accordingly, the subset of optical reference signals obtained by the UE 504 may correspond with the location of the UE 504 with reference to the TRP 502.

The UE 504 may determine the location of the TRP 502 with reference to the UE 504 and/or the location of the UE 504 with reference of the TRP 502 based on the detected subset of optical reference signals. In one example, each of the optical reference signals may include a color filter of a first color, and may be calibrated to display different color depending on the direction or angle of the UE 504 with reference to the TRP 502. The UE 504 may detect a different number of the optical reference signals displaying the first color based on the direction or angle of the UE 504 with reference to the TRP 502. Accordingly, the UE 504 may detect the direction of the UE 504 with reference to the TRP 502 based on the number of optical reference signals with the first color in the subset of optical reference signals. The direction or angle of the UE 504 with reference to the TRP 502 may be detected based on the ratio of a first number of the optical reference signals displaying the first color in the subset of optical reference signals to a second number of the optical reference signals not displaying the first color in the subset of optical reference signals.

In another example, the plurality of optical reference signals may include at least one reference light that is broadcast to a reference angle and a set of indicator lights cast in different angles with reference to the at least one reference light. The UE 504 may detect the at least one reference light and one indicator light from the set of indicator lights to detect the direction or angle of the UE 504 with reference to the TRP 502 based on the at least one reference light and the one indicator light.

In some aspects, the TRP 502 may show at least one barcode indicating at least one of the TRP ID or direction and/or angle information. The UE 504 may detect or scan the at least one barcode displayed by the TRP 502 to obtain the at least one of the TRP ID or the direction and/or angle information based on the detected barcode.

In one aspect, the at least one barcode may indicate the TRP ID information. That is, the at least one barcode shown or displayed by the TRP 502 may indicate the ID of the TRP 502, and the UE 504 may detect or scan the at least one barcode to obtain or derive the TRP ID of the TRP 502. The barcode displayed by the TRP 502 may be mapped to the ID of the TRP 502. For example, the barcode may indicate an index value of a database of TRP ID, the index value being associated with the TRP ID. The database of the TRP ID may be shared between the TRP 502 and the UE 504. The UE 504 may query external database from the network.

In another aspect, the at least one barcode may include multiple barcodes displayed in different directions. The UE 504 may detect or scan at least one barcode of the multiple barcodes and obtain location information based on the detected barcode. The UE 504 may derive the direction/angle information based on the location information obtained from the at least one barcode of the multiple barcodes. In one example, the detected barcode may indicate the TRP ID and the direction that the barcode is displayed on the TRP 502 associated with the TRP ID. Accordingly, the UE 504 may derive the location of the UE 504 based on the location of the TRP 502 and the direction that the barcode is displayed on the TRP 502. The UE 504 may identify the TRP ID and the direction of the barcode based on a database. The database may include a mapping of the barcode, the TRP ID, and the direction of barcode with reference to the TRP 502. In another example, the UE 504 may detect the angle and distance information from processing the image of the barcode detected by the camera.

In another aspect, the barcode associated with the TRP 502 may be displayed in the vicinity of the TRP 502, and the UE 504 may detect the TRP 502 that is not in a line of sight, e.g., a non-line-of-sight (NLOS) scenario. That is, the barcode associated with the TRP 502 may be shown in the vicinity of the TRP 502, e.g., adjacent building or location of the TRP 502. The UE 504 may detect the barcode from the adjacent building or locations, and infer the TRP 502 location with assistance of the database of the TRP ID.

In some aspects, the UE 504 may correlate the optical reference signal 510 and the received reference radio signal 520 for various use cases. That is, the UE 504 may receive the optical reference signal 510 and the wireless signal associated with the TRP 502, and the UE 504 may perform various functions based on the correlation between the optical reference signal 510 and the wireless signal. In one aspect, the UE 504 may use the correlation between the optical reference signal 510 and the received reference radio signal 520 for beam management.

In one aspect, the UE 504 may perform a two-stage beam management based on the optical reference signal 510. In some examples, the beam management or refinement procedures may include a hierarchical beam refinement, e.g., P1, P2, P3 procedures. Here, the P1 procedure enables the discovery of new beam pair links (BPLs), and the P2 and the P3 procedures are provided to refine an individual BPL. The P2 procedure refines the beam (transmit beam) of a BPL at the TRP 502 and the P3 procedure refines the beam (receive beam) of a BPL at the UE 504. In one example, the UE 504 may be configured to perform the coarse beam detection, e.g., the P1 procedure, based on the reference radio signal 520, and perform the finer beam detection and tuning, e.g., the P2 or P3 procedures, based on the optical reference signal 510.

In another aspect, the UE 504 may perform a fast cell acquisition, e.g., the cell search and system acquisition procedure, based on the optical reference signal 510. To perform the cell search and system acquisition procedure, the UE 504 may blindly search for and decode PSS/SSS to obtain the PCI. In one example, the UE 504 may obtain the optical reference signal 510 indicating the TRP ID, and the TRP ID may be associated with the PCI. Accordingly, the UE 504 may search the PCI based on the TRP ID obtained from the optical reference signal 510 without performing the blind search of the PSS/SSS, and the UE 504 may reserve UE power and reduce the network delay and overhead.

In some examples, the association between the TRP ID and the PCI may be based on a database or a rule agreed between the UE 504 and the network including the TRP 502. In one example, the UE 504 may refer to the database to search for the PCI associated with the TRP ID obtained from the optical reference signal 510. In another example, the association between the TRP ID and the PCI may be represented by a formula, and the UE 504 may obtain the PCI by applying the TRP ID from the optical reference signal 510 to the formula.

The TRP 502 may be configured to include the MIB and SIB information in the optical reference signal 510 and transmit, to the UE 504, the MIB and SIB information in the optical reference signal 510 to reduce the delay of MIB/SIB info acquisition. That is, the TRP 502 may transmit the MIB and the SIB information in the optical reference signal 510, and the UE 504 may directly obtain the MIB and the SIB information from the optical reference signal 510. The TRP 502 and the UE 504 may reduce the delay of MIB/SIB info acquisition by communicating the MIB and the SIB information in the optical reference signal 510.

In another aspect, the UE 504 may perform a positioning procedure based on the correlation between the optical reference signal 510 and the wireless signal. That is, the UE 504 may detect the location of the TRP 502 using both of the optical reference signal 510 and the wireless signal, and the UE 504 may further detect the location of the UE 504 based on both of the optical reference signal 510 and the wireless signal with reference to the TRP 502. By diversifying the reference signals to two different sources, e.g., the optical reference signal 510 and the reference radio signal 520, the UE 504 may detect the location of the TRP 502 and the UE 504 with improved accuracy.

In another aspect, the UE 504 may perform fake TRP detection based on the optical reference signal 510 and the reference radio signal 520. That is, the UE 504 may validate the TRP 502 based on the optical reference signal 510 and the received reference radio signal 520. In one example, the UE 504 may obtain the ID of the TRP 502 from the optical reference signal 510 and obtain the PCI from the reference radio signal 520, and the UE 504 may check whether the TRP ID from the optical reference signal 510 matches the cell ID from the reference radio signal 520 to perform the TRP 502 validation. In response to detecting that the TRP ID from the optical reference signal 510 does not match the cell ID from the reference radio signal 520, the UE 504 may determine that the TRP 502 failed to pass the validation and is likely an unauthorized TRP.

In some aspects, the UE 504 or the TRP 502 may perform a weather and/or pollution detection based on optical reference signal 510 received from the TRP 502. That is, at least one optical reference signal 510 detected by the UE 504 and corresponding information of the detected optical reference signal 510, e.g., signal strength, may be different based on the weather and/or pollution condition, and the radio communication environment status between the TRP 502 and the UE 504 may depend on the weather and/or pollution condition associated with the at least one optical reference signal 510 detected by the UE 504 and the corresponding strengths of the detected optical reference signal 510. Accordingly, the UE 504 or the TRP 502 may infer the weather and/or pollution conditions from information of the optical reference signal 510 detected by the UE 504, and detect the radio communication environment status of the TRP 502. The network may determine at least one network configuration based on the detected radio communication environment status of the TRP 502.

The UE 504 may detect the at least one optical reference signal 510 and obtain information of the detected optical reference signal 510. The information of the detected optical reference signal 510 may include at least one of the strength of the detected optical reference signal 510, a pattern of the optical reference signal 510, or the TRP ID. The UE 504 may report the information of the detected optical reference signal 510 to the TRP 502.

The weather/pollution detection may be performed by the network or a server including the TRP 502 based on data of multiple UEs including the UE 504. That is, the TRP 502 may receive multiple reports of the information of the optical reference signal 510 detected by a plurality of UEs including the UE 504, and perform the weather and/or pollution detection based on the received multiple reports of the information of the optical reference signal 510 detected by the plurality of UEs including the UE 504.

The TRP 502 may include the AI or ML models configured to determine the weather and/or pollution status. Here, the weather and/or pollution status may represent the radio communication environment status of the TRP 502. For example, the TRP 502 may include the weather and/or pollution detection model including the AI model or the ML model to perform the weather and/or pollution detection. The weather and/or pollution detection model may be configured to receive the multiple reports of the information of the optical reference signal 510 detected by a plurality of UEs including the UE 504, and output the weather and/or pollution status. The input of the weather and/or pollution detection model may also include at least one of the corresponding date and/or time, location, TRP ID, temperature, or humidity. The weather and/or pollution detection model may be configured to receive the input and generate the weather and/or pollution.

In one aspect, the TRP 502 may determine the radio transmission impacting factor based on the generated weather and/or pollution status. The radio transmission impacting factor may represent the radio communication environment status, and the TRP 502 may manage at least one network configuration based on the radio transmission impacting factor. Here, managing the at least one network configuration may include fine tuning the propagation prediction model. In one example, the propagation prediction model may include the AI/ML model, and the TRP 502 may fine tune the propagation prediction model using the radio transmission impacting factor. In another example, the TRP 502 may include an integrated AI/ML model configured to determine the radio transmission impacting factor based on the multiple reports of the information of the optical reference signal 510 detected by a plurality of UEs including the UE 504.

The TRP 502 may transmit, to the plurality of UEs including the UE 504, the radio transmission impacting factor determined based on the weather and/or pollution status. The plurality of UEs including the UE 504 may receive the radio transmission impacting factor from the TRP 502, and manage at least one network configuration based on the radio transmission impacting factor. Here, managing the at least one network configuration may include fine tuning the propagation prediction model. In one example, the propagation prediction model of each UE 504 may include the AI/ML model, and each UE 504 may fine tune the propagation prediction model using the radio transmission impacting factor.

In another aspect, the TRP 502 may transmit, to the plurality of UEs including the UE 504, the weather and/or pollution status determined by the weather and/or pollution detection model based on the multiple reports of the information of the optical reference signal 510 detected by a plurality of UEs including the UE 504. That is, at least one UE 504 of the plurality of UEs including the UE 504 may receive the weather and/or pollution status and determine the radio transmission impacting factor based on the weather and/or pollution status. The radio transmission impacting factor may represent the radio communication environment status, and the UE 504 may manage at least one network configuration based on the radio transmission impacting factor. Here, managing the at least one network configuration may include fine tuning the propagation prediction model in the UE 504. In one example, the propagation prediction model may include the AI/ML model, and the UE 504 may fine tune the propagation prediction model using the radio transmission impacting factor.

Figure 6:
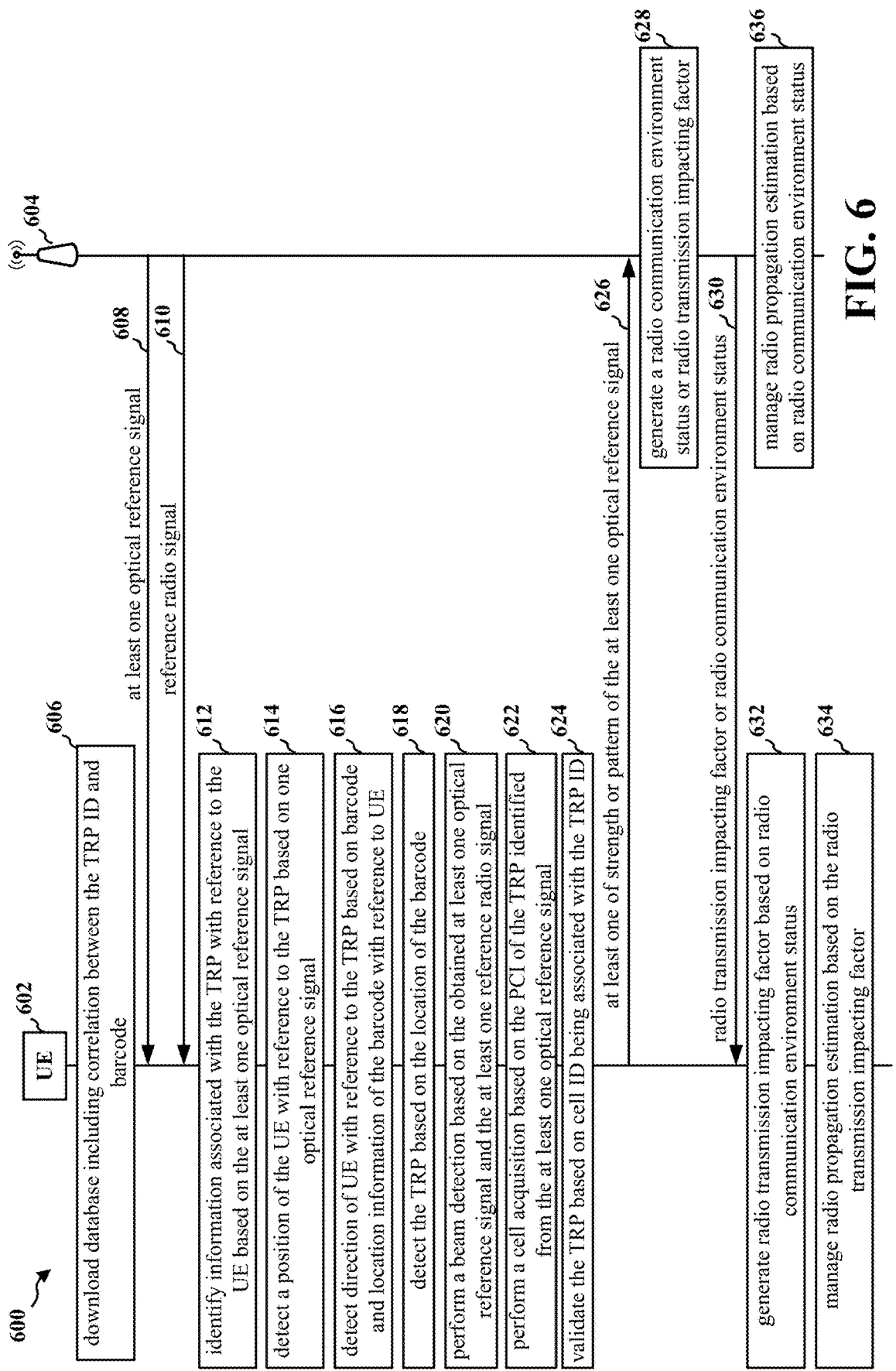
FIG. 6 is a call-flow diagram of a method of wireless communication.

FIG. 6 is a call-flow diagram 600 of a method of wireless communication. The call-flow diagram 600 may include a UE 602 and a TRP 604. The UE 602 may obtain at least one optical reference signal associated with the TRP 604, the at least one optical reference signal including at least one of: a TRP ID or direction information of the at least one optical reference signal with reference to the TRP 604. The UE 602 may identify information associated with the TRP 604 with reference to the UE 602 based on the at least one optical reference signal, and perform at least one of a cell acquisition, a beam management, a UE position detection, a TRP validation, or an ambient environment detection based on the identified information associated with the TRP 604. The UE 602 may also receive at least one reference radio signal, and use the correlation between the optical reference signal and the received reference radio signal.

At 606, the UE 602 may download a database from a network or a server, the database including a correlation between a plurality of barcodes and a plurality of optical reference signals. Here, the UE 602 may download the database from the network or server when it is in an RRC_CONNECTED state. Also, the UE 602 may cache the database. If the UE 602 has a previously cached database, the UE 602 may omit downloading the database. In some instances, the database may be indicated to the UE from another source (e.g., TRP 604). The at least one optical reference signal may be associated with a barcode, and the at least one optical reference signal may be obtained by scanning the barcode. The UE 602 may refer to the cached database to obtain the TRP ID from the scanned barcode.

At 608, the TRP 604 may transmit, for at least one UE 602, at least one optical reference signal including at least one of a TRP ID or direction information of the at least one optical reference signal with reference to the TRP 604. The UE 602 may obtain at least one optical reference signal associated with a TRP 604, the at least one optical reference signal including at least one of a TRP ID or direction information of the at least one optical reference signal with reference to the TRP 604. The at least one optical reference signal may include a plurality of optical reference signals cast in different directions, and each optical reference signal of the plurality of optical reference signals indicates the direction in which the optical reference signal is cast. The UE 602 may perform at least one of a cell acquisition, a beam management, a UE position detection, a TRP validation, or an ambient environment detection based on the identified information associated with the TRP 604.

At 610, the TRP 604 may transmit at least one reference radio signal. The UE 602 may receive at least one reference radio signal from the TRP 604. The UE 602 may correlate the optical reference signal received at 608 and the reference radio signal to identify information associated with the TRP 604 to perform at least one of a cell acquisition, a beam management, a UE position detection, a TRP validation, or an ambient environment detection.

At 612, the UE 602 may identify information associated with the TRP 604 with reference to the UE 602 based on the at least one optical reference signal. The information associated with the TRP 604 may indicate at least one of TRP ID, TRP location, e.g., direction/angle information of TRP 604 with reference to the UE 602, validity of the TRP 604, beam management, PCI for cell acquisition, or radio transmission impacting factor.

In one aspect, the barcode may indicate the TRP ID, and the at least one optical reference signal may be obtained by scanning the barcode. That is, the TRP ID of the TRP 604 may be identified based on a database including the barcode received at 606. The ID of the TRP 604 may be modulated using various modulation methods. In one example, the optical reference signal may include a set of binary light signals (on or off), and the TRP ID may be modulated by indicating a binary value of the TRP ID using the set of light signals. In another example, the optical reference signal may include a set of colored light signals, each of the colored light signals may be configured to carry 2-bit information. In another example, the optical reference signal may include VLC style digital modulation. In another aspect, the lights, e.g., a plurality of optical reference signals, from the TRP 604 may be cast in different directions for the UE 602 to detect the direction and/or angle of the TRP 604 with reference to the UE 602. In another aspect, at least one barcode shown or displayed by the TRP 604 may indicate the ID of the TRP 604, and the UE 602 may detect or scan the at least one barcode to obtain or derive the TRP ID of the TRP 604.

At 614, the UE 602 may detect a position of the UE 602 with reference to the TRP 604 based on one optical reference signal. In one aspect, the UE 602 may detect a position of the UE 602 with reference to the TRP 604 based on one optical reference signal of the plurality of optical reference signals. Here, the at least one optical reference signal may include a plurality of optical reference signals cast in different directions, and each optical reference signal of the plurality of optical reference signals may indicate the direction in which the optical reference signal is cast. In another aspect, the UE 602 may detect a position of the UE 602 with reference to the TRP 604 based on the at least one optical reference signal received at 608 and the at least one reference radio signal received at 610. By diversifying the reference signals to two different sources, e.g., the optical reference signal 510 and the reference radio signal 520, the UE 602 may detect the location of the TRP 604 and the UE 602 with improved accuracy.

At 616, the UE 602 may detect the location information of the barcode with reference to the UE 602. In one aspect, the UE 602 may detect the direction of the UE 602 with reference to the TRP 604 based on the barcode and location information of the barcode with reference to the UE 602. Here, the barcode may indicate a direction of the TRP 604 with reference to the barcode.

At 618, the UE 602 may detect the TRP 604 based on the location of the barcode. Here, the barcode may indicate a location of the TRP 604. That is, the barcode may indicate a direction of the TRP 604 with reference to the barcode, and the UE 602 may identify the location of the detected TRP (e.g., TRP 604) based on a database including the location of the detected TRP (e.g., TRP 604).

At 620, the UE 602 may perform a beam detection based on the at least one optical reference signal obtained at 608 and the at least one reference radio signal received at 610. In one aspect, the UE 602 may perform a two-stage beam management based on the at least one optical reference signal obtained at 608 and the at least one reference radio signal received at 610. That is, the UE 602 may identify a subset of beams from a plurality of beams based on the at least one reference radio signal, and identify one beam from the subset of beams based on the at least one optical reference signal. For example, the UE 602 may perform the coarse beam detection, e.g., the P1 procedure, based on the reference radio signal, and perform the finer beam detection and tuning, e.g., the P2 or P3 procedures, based on the optical reference signal.

At 622, the UE 602 may perform a cell acquisition based on the PCI of the TRP identified from the at least one optical reference signal. That is, the UE 602 may perform a fast cell acquisition, e.g., the cell search and system acquisition procedure, based on the optical reference signal. In one aspect, the optical reference signal may indicate TRP ID associated with the PCI, and the UE 602 may identify the PCI without blind searching for the PSS/SSS. Therefore, the UE 602 may reserve UE power and reduce the network delay and overhead in cell acquisition. The association between the TRP ID and the PCI may be based on a database or a rule agreed between the UE 602 and the network including the TRP 604. In another aspect, the optical reference signal may include the MIB and SIB information.

At 624, the UE 602 may validate the TRP 604 based on the cell ID of the TRP 604 being associated with the TRP ID of the at least one optical reference signal. Here, the reference radio signal received at 610 may indicate the cell ID of the TRP 604, and the UE 602 may perform fake TRP detection based on the optical reference signal and the reference radio signal. The UE 602 may check whether the TRP ID from the optical reference signal matches the cell ID from the reference radio signal to perform the TRP validation, and in response to detecting that the TRP ID from the optical reference signal does not match the cell ID from the reference radio signal, the UE 602 may determine that the TRP 604 failed to pass the validation and is likely an unauthorized TRP.

In some aspects, the UE 602 and/or the TRP 604 may perform a weather and/or pollution detection based on optical reference signal received from the TRP 604. The network may determine at least one network configuration based on the detected radio communication environment status of the TRP 604.

At 626, the UE 602 may transmit, to the TRP 604, information associated with the TRP 604 with reference the at least one UE 602 based on the at least one optical reference signal received at 608. The TRP 604 may receive information associated with the TRP 604 with reference the at least one UE 602 based on the at least one optical reference signal transmitted at 608. Here, the information may be associated with the TRP 604 with reference the at least one UE 602 based on the at least one optical reference signal includes at least one of a strength or a pattern of the at least one optical reference signal.

At 628, the TRP 604 may generate a radio communication environment status based on at least one of the strength or the pattern of the at least one optical reference signal, and generate at least one radio transmission impacting factor based on the radio communication environment status.

In one aspect, the weather/pollution detection may be performed by the network or a server including the TRP 604 based on data of multiple UEs including the UE 602. That is, the TRP 604 may receive multiple reports of the information of the optical reference signal detected by a plurality of UEs including the UE 602, and perform the weather and/or pollution detection based on the received multiple reports of the information of the optical reference signal detected by the plurality of UEs including the UE 602. The TRP 604 may include the weather and/or pollution detection model including the AI model or the ML model to perform the weather and/or pollution detection.

In another aspect, the TRP 604 may determine the radio transmission impacting factor based on the generated weather and/or pollution status. The radio transmission impacting factor may represent the radio communication environment status, and the TRP 604 may manage at least one network configuration based on the radio transmission impacting factor.

At 630, the TRP 604 may transmit the radio transmission impacting factor or the radio communication environment status. The UE 602 may receive, from the TRP 604, the radio transmission impacting factor or the radio communication environment status. Here, the radio transmission impacting factor may be based on at least one of the strength or the pattern of the at least one optical reference signal, and the radio communication environment status may be based on at least one of the strength or the pattern of the at least one optical reference signal.

At 632, the UE 602 may generate at least one radio transmission impacting factor based on the radio communication environment status. Based on receiving the radio communication environment status at 630, the UE 602 may generate the at least one radio transmission impacting factor to manage radio propagation estimation. Here, the at least one radio transmission impacting factor may be generated by AI/ML algorithm.

At 634, the UE 602 may manage radio propagation estimation based on the radio transmission impacting factor.

Here, managing the at least one network configuration may include fine tuning the propagation prediction model based on the radio transmission impacting factor received at 630 or generated at 632, and the radio propagation estimation may be performed by AI/ML algorithm.

At 636, the TRP 604 may manage radio propagation estimation based on the radio communication environment status. Here, managing the at least one network configuration may include fine tuning the propagation prediction model, and the radio propagation estimation may be performed by AI/ML algorithm.

Figure 7:
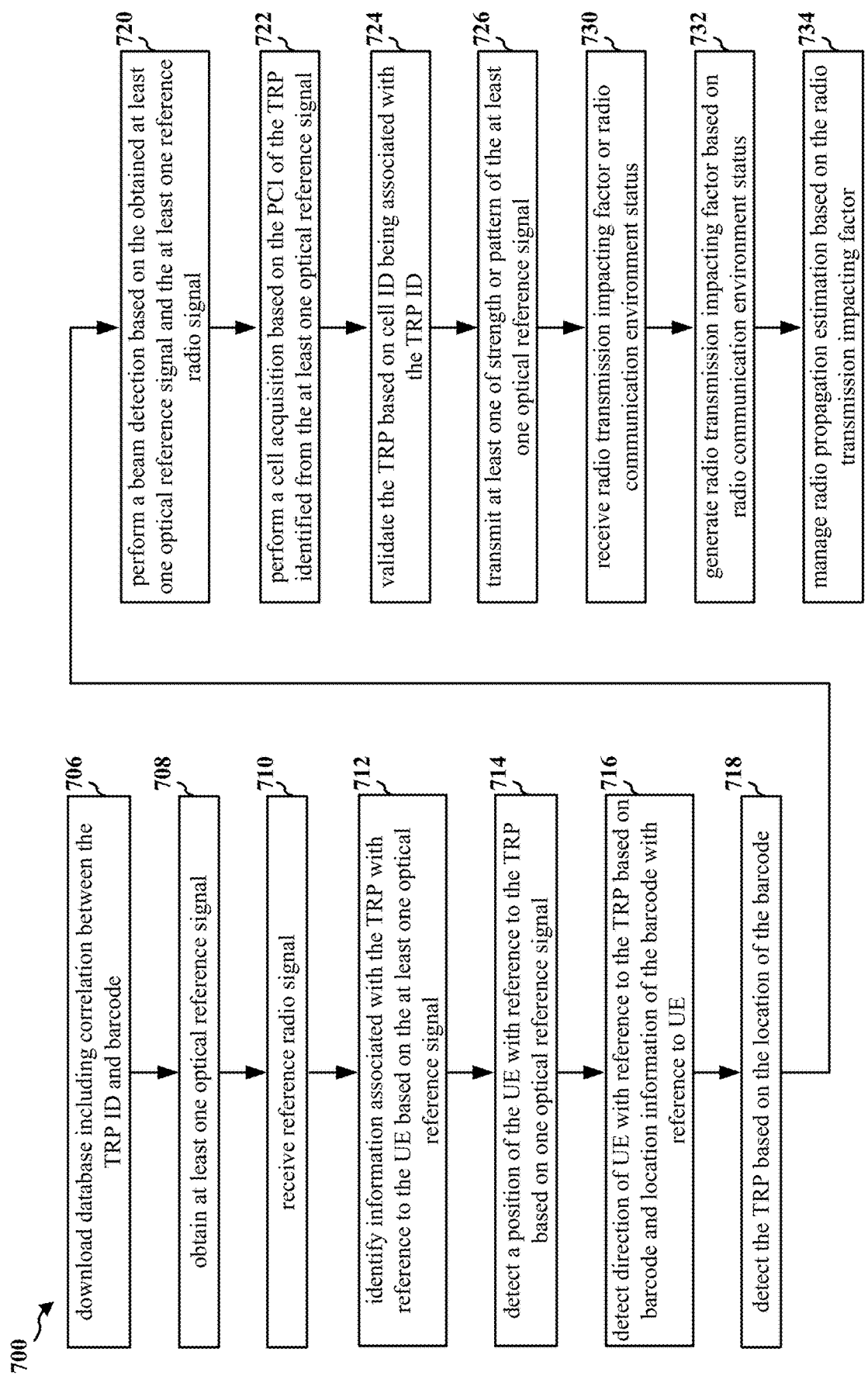
FIG. 7 is a flowchart of a method of wireless communication.

FIG. 7 is a flowchart 700 of a method of wireless communication. The method may be performed by a UE (e.g., the UE 104; the UE 404/504/602; the apparatus 1104). The UE may obtain at least one optical reference signal associated with the TRP, the at least one optical reference signal including at least one of: the TRP ID or direction information of the at least one optical reference signal with reference to the TRP, and identify information associated with the TRP with reference to the UE based on the at least one optical reference signal. The UE may also receive at least one reference radio signal, and use the correlation between the optical reference signal and the received reference radio signal.

At 706, the UE may download a database from a network or a server, the database including the correlation between a plurality of barcodes and a plurality of optical reference signals. Here, the UE may download the database from the network when it is in the RRC_CONNECTED state. Also, the UE may cache the database. If the UE has a previously cached database, the UE may omit downloading the database. In some instances, the database may be indicated to the UE from another source (e.g., TRP). The at least one optical reference signal may be associated with a barcode, and the at least one optical reference signal may be obtained by scanning the barcode. The UE may refer to the cached database to obtain the TRP ID from the scanned barcode. For example, at 606, the UE 602 may receive a database from a network or a network node, the database indicating the correlation between a plurality of barcodes and a plurality of optical reference signals. Furthermore, 706 may be performed by an optical reference signal component 198.

At 708, the UE may obtain at least one optical reference signal associated with a TRP, the at least one optical reference signal including at least one of a TRP ID or direction information of the at least one optical reference signal with reference to the TRP. The at least one optical reference signal may include a plurality of optical reference signals cast in different directions, and each optical reference signal of the plurality of optical reference signals indicates the direction in which the optical reference signal is cast.

The UE may perform at least one of a cell acquisition, a beam management, a UE position detection, a TRP validation, or an ambient environment detection based on the identified information associated with the TRP. For example, at 608, the UE 602 may obtain at least one optical reference signal associated with a TRP 604, the at least one optical reference signal including at least one of a TRP ID or direction information of the at least one optical reference signal with reference to the TRP 604. Furthermore, 708 may be performed by the optical reference signal component 198.

At 710, the UE may receive at least one reference radio signal from the TRP. The UE may correlate the optical reference signal received at 708 and the reference radio signal to identify information associated with the TRP to perform at least one of a cell acquisition, a beam management, a UE position detection, a TRP validation, or an ambient environment detection. For example, at 610, the UE 602 may receive at least one reference radio signal from the TRP 604. Furthermore, 710 may be performed by the optical reference signal component 198.

At 712, the UE may identify information associated with the TRP with reference to the UE based on the at least one optical reference signal. The information associated with the TRP may indicate at least one of TRP ID, TRP location, e.g., direction/angle information of TRP with reference to the UE, validity of the TRP, beam management, PCI for cell acquisition, or radio transmission impacting factor. In one aspect, the barcode may indicate the TRP ID, and the at least one optical reference signal may be obtained by scanning the barcode. That is, the TRP ID of the TRP may be identified based on a database including the barcode received at 706. The ID of the TRP may be modulated using various modulation methods. In one example, the optical reference signal may include a set of binary light signals (on or off), and the TRP ID may be modulated by indicating a binary value of the TRP ID using the set of light signals. In another example, the optical reference signal may include a set of colored light signals, each of the colored light signals may be configured to carry 2-bit information. In another example, the optical reference signal may include VLC style digital modulation. In another aspect, the lights, e.g., a plurality of optical reference signals, from the TRP may be cast in different directions for the UE to detect the direction and/or angle of the TRP with reference to the UE. In another aspect, at least one barcode shown or displayed by the TRP may indicate the ID of the TRP, and the UE may detect or scan the at least one barcode to obtain or derive the TRP ID of the TRP. For example, at 612, the UE 602 may identify information associated with the TRP 604 with reference to the UE 602 based on the at least one optical reference signal. Furthermore, 712 may be performed by the optical reference signal component 198.

At 714, the UE may detect a position of the UE with reference to the TRP based on one optical reference signal. In one aspect, the UE may detect a position of the UE with reference to the TRP based on one optical reference signal of the plurality of optical reference signals. Here, the at least one optical reference signal may include a plurality of optical reference signals cast in different directions, and each optical reference signal of the plurality of optical reference signals may indicate the direction in which the optical reference signal is cast. In another aspect, the UE may detect a position of the UE with reference to the TRP based on the at least one optical reference signal received at 708 and the at least one reference radio signal received at 710. By diversifying the reference signals to two different sources, e.g., the optical reference signal 510 and the reference radio signal 520, the UE may detect the location of the TRP and the UE with improved accuracy. For example, at 614, the UE 602 may detect a position of the UE 602 with reference to the TRP 604 based on one optical reference signal. Furthermore, 714 may be performed by the optical reference signal component 198.

At 716, the UE may detect the location information of the barcode with reference to the UE. In one aspect, the UE may detect the direction of the UE with reference to the TRP based on the barcode and location information of the barcode with reference to the UE. Here, the barcode may indicate a direction of the TRP with reference to the barcode. For example, at 616, the UE 602 may detect the location information of the barcode with reference to the UE 602. Furthermore, 716 may be performed by the optical reference signal component 198.

At 718, the UE may detect the TRP based on the location of the barcode. Here, the barcode may indicate a location of the TRP. That is, the barcode may indicate a direction of the TRP with reference to the barcode, and the UE may identify the location of the detected TRP based on a database including the location of the detected TRP. For example, at 618, the UE 602 may detect the TRP 604 based on the location of the barcode. Furthermore, 718 may be performed by the optical reference signal component 198.

At 720, the UE may perform a beam detection based on the at least one optical reference signal obtained at 708 and the at least one reference radio signal received at 710. In one aspect, the UE may perform a two-stage beam management based on the at least one optical reference signal obtained at 708 and the at least one reference radio signal received at 710. That is, the UE may identify a subset of beams from a plurality of beams based on the at least one reference radio signal, and identify one beam from the subset of beams based on the at least one optical reference signal. For example, the UE may perform the coarse beam detection, e.g., the P1 procedure, based on the reference radio signal, and perform the finer beam detection and tuning, e.g., the P2 or P3 procedures, based on the optical reference signal. For example, at 620, the UE 602 may perform a beam detection based on the at least one optical reference signal obtained at 608 and the at least one reference radio signal received at 610. Furthermore, 720 may be performed by the optical reference signal component 198.

At 722, the UE may perform a cell acquisition based on the PCI of the TRP identified from the at least one optical reference signal. That is, the UE may perform a fast cell acquisition, e.g., the cell search and system acquisition procedure, based on the optical reference signal. In one aspect, the optical reference signal may indicate TRP ID associated with the PCI, and the UE may identify the PCI without blind searching for the PSS/SSS. Therefore, the UE may reserve UE power and reduce the network delay and overhead in cell acquisition. The association between the TRP ID and the PCI may be based on a database or a rule agreed between the UE and the network including the TRP. In another aspect, the optical reference signal may include the MIB and SIB information. For example, at 622, the UE 602 may perform a cell acquisition based on the PCI of the TRP identified from the at least one optical reference signal. Furthermore, 722 may be performed by the optical reference signal component 198.

At 724, the UE may validate the TRP based on the cell ID of the TRP being associated with the TRP ID of the at least one optical reference signal. Here, the reference radio signal received at 710 may indicate the cell ID of the TRP, and the UE may perform fake TRP detection based on the optical reference signal and the reference radio signal. The UE may check whether the TRP ID from the optical reference signal matches the cell ID from the reference radio signal to perform the TRP validation, and in response to detecting that the TRP ID from the optical reference signal does not match the cell ID from the reference radio signal, the UE may determine that the TRP failed to pass the validation and is likely an unauthorized TRP. In some aspects, the UE and/or the TRP may perform a weather and/or pollution detection based on optical reference signal received from the TRP. The network may determine at least one network configuration based on the detected radio communication environment status of the TRP. For example, at 624, the UE 602 may validate the TRP 604 based on the cell ID of the TRP 604 being associated with the TRP ID of the at least one optical reference signal. Furthermore, 724 may be performed by the optical reference signal component 198.

At 726, the UE may transmit, to the TRP, information associated with the TRP with reference the at least one UE based on the at least one optical reference signal received at 708. Here, the information may be associated with the TRP with reference the at least one UE based on the at least one optical reference signal includes at least one of a strength or a pattern of the at least one optical reference signal. For example, at 626, the UE 602 may transmit, to the TRP 604, information associated with the TRP 604 with reference the at least one UE 602 based on the at least one optical reference signal received at 608. Furthermore, 726 may be performed by the optical reference signal component 198.

At 730, the UE may receive, from the TRP, the radio transmission impacting factor or the radio communication environment status. Here, the radio transmission impacting factor may be based on at least one of the strength or the pattern of the at least one optical reference signal, and the radio communication environment status may be based on at least one of the strength or the pattern of the at least one optical reference signal. For example, at 630, the UE 602 may receive, from the TRP 604, the radio transmission impacting factor or the radio communication environment status. Furthermore, 730 may be performed by the optical reference signal component 198.

At 732, the UE may generate at least one radio transmission impacting factor based on the radio communication environment status. Based on receiving the radio communication environment status at 730, the UE may generate the at least one radio transmission impacting factor to manage radio propagation estimation. Here, the at least one radio transmission impacting factor may be generated by AI/ML algorithm. For example, at 632, the UE 602 may generate at least one radio transmission impacting factor based on the radio communication environment status. Furthermore, 732 may be performed by the optical reference signal component 198.

At 734, the UE may manage radio propagation estimation based on the radio transmission impacting factor. Here, managing the at least one network configuration may include fine tuning the propagation prediction model based on the radio transmission impacting factor received at 730 or generated at 732, and the radio propagation estimation may be performed by AI/ML algorithm. For example, at 634, the UE 602 may manage radio propagation estimation based on the radio transmission impacting factor. Furthermore, 734 may be performed by the optical reference signal component 198.

Figure 8:
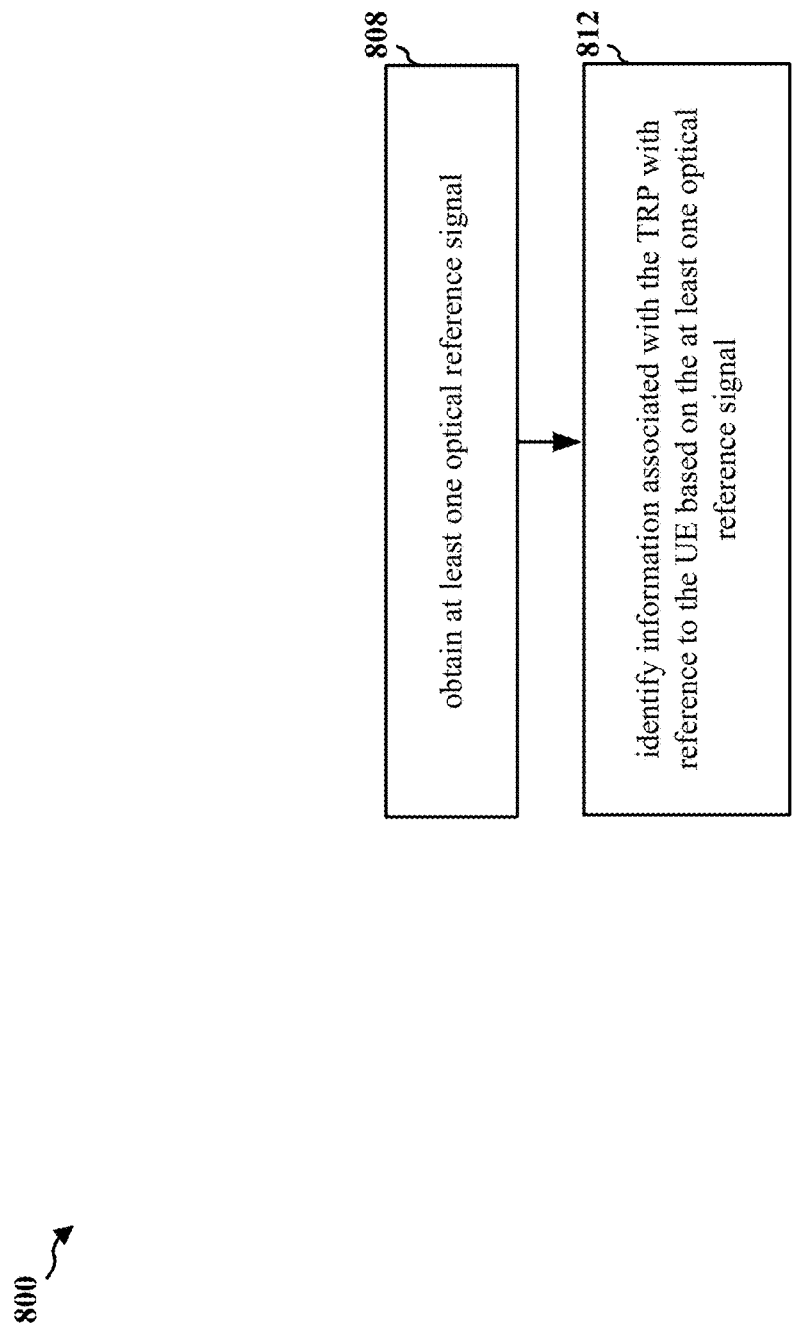
FIG. 8 is a flowchart of a method of wireless communication.

FIG. 8 is a flowchart 800 of a method of wireless communication. The method may be performed by a UE (e.g., the UE 104; the UE 404/504/602; the apparatus 1104). The UE may obtain at least one optical reference signal associated with the TRP, the at least one optical reference signal including at least one of: the TRP ID or direction information of the at least one optical reference signal with reference to the TRP, and identify information associated with the TRP with reference to the UE based on the at least one optical reference signal. The UE may also receive at least one reference radio signal, and use the correlation between the optical reference signal and the received reference radio signal.

At 808, the UE may obtain at least one optical reference signal associated with a TRP, the at least one optical reference signal including at least one of a TRP ID or direction information of the at least one optical reference signal with reference to the TRP. The at least one optical reference signal may include a plurality of optical reference signals cast in different directions, and each optical reference signal of the plurality of optical reference signals indicates the direction in which the optical reference signal is cast. The UE may perform at least one of a cell acquisition, a beam management, a UE position detection, a TRP validation, or an ambient environment detection based on the identified information associated with the TRP. For example, at 608, the UE 602 may obtain at least one optical reference signal associated with a TRP 604, the at least one optical reference signal including at least one of a TRP ID or direction information of the at least one optical reference signal with reference to the TRP 604. Furthermore, 808 may be performed by the optical reference signal component 198.

At 812, the UE may identify information associated with the TRP with reference to the UE based on the at least one optical reference signal. The information associated with the TRP may indicate at least one of TRP ID, TRP location, e.g., direction/angle information of TRP with reference to the UE, validity of the TRP, beam management, PCI for cell acquisition, or radio transmission impacting factor. In one aspect, the barcode may indicate the TRP ID, and the at least one optical reference signal may be obtained by scanning the barcode. That is, the TRP ID of the TRP may be identified based on a database including the barcode. The ID of the TRP may be modulated using various modulation methods. In one example, the optical reference signal may include a set of binary light signals (on or off), and the TRP ID may be modulated by indicating a binary value of the TRP ID using the set of light signals. In another example, the optical reference signal may include a set of colored light signals, each of the colored light signals may be configured to carry 2-bit information. In another example, the optical reference signal may include VLC style digital modulation. In another aspect, the lights, e.g., a plurality of optical reference signals, from the TRP may be cast in different directions for the UE to detect the direction and/or angle of the TRP with reference to the UE. In another aspect, at least one barcode shown or displayed by the TRP may indicate the ID of the TRP, and the UE may detect or scan the at least one barcode to obtain or derive the TRP ID of the TRP. For example, at 612, the UE 602 may identify information associated with the TRP 604 with reference to the UE 602 based on the at least one optical reference signal. Furthermore, 812 may be performed by the optical reference signal component 198.

Figure 9:
FIG. 9 is a flowchart of a method of wireless communication.

FIG. 9 is a flowchart 900 of a method of wireless communication. The method may be performed by a TRP (e.g., the base station 102; the TRP 402/502/604; the network entity 1202/1302). The TRP may transmit, for at least one UE, at least one optical reference signal including at least one of: a TRP identifier (ID) or direction information of the at least one optical reference signal with reference to the TRP and receive information associated with the TRP with reference the at least one UE based on the at least one optical reference signal.

At 908, the TRP may transmit, for at least one UE, at least one optical reference signal including at least one of a TRP ID or direction information of the at least one optical reference signal with reference to the TRP. The at least one optical reference signal may include a plurality of optical reference signals cast in different directions, and each optical reference signal of the plurality of optical reference signals indicates the direction in which the optical reference signal is cast. The UE may perform at least one of a cell acquisition, a beam management, a UE position detection, a TRP validation, or an ambient environment detection based on the identified information associated with the TRP. For example, at 608, the TRP 604 may transmit, for at least one UE 602, at least one optical reference signal including at least one of a TRP ID or direction information of the at least one optical reference signal with reference to the TRP 604. Furthermore, 908 may be performed by the optical reference signal component 199.

At 910, the TRP may transmit at least one reference radio signal. The UE may correlate the optical reference signal received at 708 and the reference radio signal to identify information associated with the TRP to perform at least one of a cell acquisition, a beam management, a UE position detection, a TRP validation, or an ambient environment detection. For example, at 610, the TRP 604 may transmit at least one reference radio signal. Furthermore, 910 may be performed by the optical reference signal component 199.

At 926, the TRP may receive information associated with the TRP with reference the at least one UE based on the at least one optical reference signal transmitted at 908. Here, the information may be associated with the TRP with reference the at least one UE based on the at least one optical reference signal includes at least one of a strength or a pattern of the at least one optical reference signal. For example, at 626, the TRP 604 may receive information associated with the TRP 604 with reference the at least one UE 602 based on the at least one optical reference signal transmitted at 608. Furthermore, 926 may be performed by the optical reference signal component 199.

At 928, the TRP generate a radio communication environment status based on at least one of the strength or the pattern of the at least one optical reference signal, and generate at least one radio transmission impacting factor based on the radio communication environment status. In one aspect, the weather/pollution detection may be performed by the network or a server including the TRP based on data of multiple UEs including the UE. That is, the TRP may receive multiple reports of the information of the optical reference signal detected by a plurality of UEs including the UE, and perform the weather and/or pollution detection based on the received multiple reports of the information of the optical reference signal detected by the plurality of UEs including the UE. The TRP may include the weather and/or pollution detection model including the AI model or the ML model to perform the weather and/or pollution detection. In another aspect, the TRP may determine the radio transmission impacting factor based on the generated weather and/or pollution status. The radio transmission impacting factor may represent the radio communication environment status, and the TRP may manage at least one network configuration based on the radio transmission impacting factor. For example, at 628, the TRP 604 may generate a radio communication environment status based on at least one of the strength or the pattern of the at least one optical reference signal, and generate at least one radio transmission impacting factor based on the radio communication environment status. Furthermore, 928 may be performed by the optical reference signal component 199.

At 930, the TRP transmit the radio transmission impacting factor or the radio communication environment status. Here, the radio transmission impacting factor may be based on at least one of the strength or the pattern of the at least one optical reference signal, and the radio communication environment status may be based on at least one of the strength or the pattern of the at least one optical reference signal. For example, at 630, the TRP 604 may transmit the radio transmission impacting factor or the radio communication environment status. Furthermore, 930 may be performed by the optical reference signal component 199.

At 936, the TRP may manage radio propagation estimation based on the radio communication environment status. Here, managing the at least one network configuration may include fine tuning the propagation prediction model, and the radio propagation estimation may be performed by AI/ML algorithm. For example, at 636, the TRP 604 may manage radio propagation estimation based on the radio communication environment status. Furthermore, 936 may be performed by the optical reference signal component 199.

Figure 10:
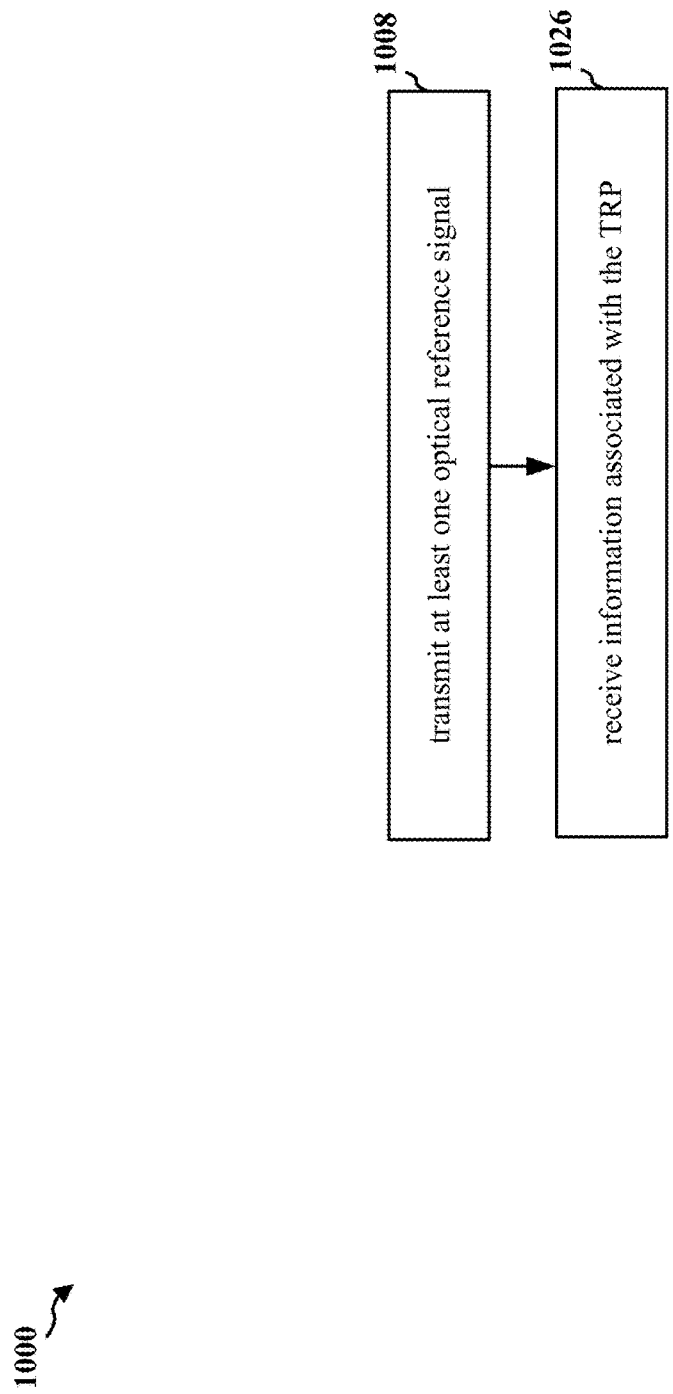
FIG. 10 is a flowchart of a method of wireless communication.

FIG. 10 is a flowchart 1000 of a method of wireless communication. The method may be performed by a TRP (e.g., the base station 102; the TRP 402/502/604; the network entity 1202/1302). The TRP may transmit, for at least one UE, at least one optical reference signal including at least one of: a TRP identifier (ID) or direction information of the at least one optical reference signal with reference to the TRP and receive information associated with the TRP with reference the at least one UE based on the at least one optical reference signal.

At 1008, the TRP may transmit, for at least one UE, at least one optical reference signal including at least one of a TRP ID or direction information of the at least one optical reference signal with reference to the TRP. The at least one optical reference signal may include a plurality of optical reference signals cast in different directions, and each optical reference signal of the plurality of optical reference signals indicates the direction in which the optical reference signal is cast. The UE may perform at least one of a cell acquisition, a beam management, a UE position detection, a TRP validation, or an ambient environment detection based on the identified information associated with the TRP. For example, at 608, the TRP 604 may transmit, for at least one UE 602, at least one optical reference signal including at least one of a TRP ID or direction information of the at least one optical reference signal with reference to the TRP 604. Furthermore, 1008 may be performed by the optical reference signal component 199.

At 1026, the TRP may receive information associated with the TRP with reference the at least one UE based on the at least one optical reference signal transmitted at 1008. Here, the information may be associated with the TRP with reference the at least one UE based on the at least one optical reference signal includes at least one of a strength or a pattern of the at least one optical reference signal. For example, at 626, the TRP 604 may receive information associated with the TRP 604 with reference the at least one UE 602 based on the at least one optical reference signal transmitted at 608. Furthermore, 1026 may be performed by the optical reference signal component 199.

Figure 11:
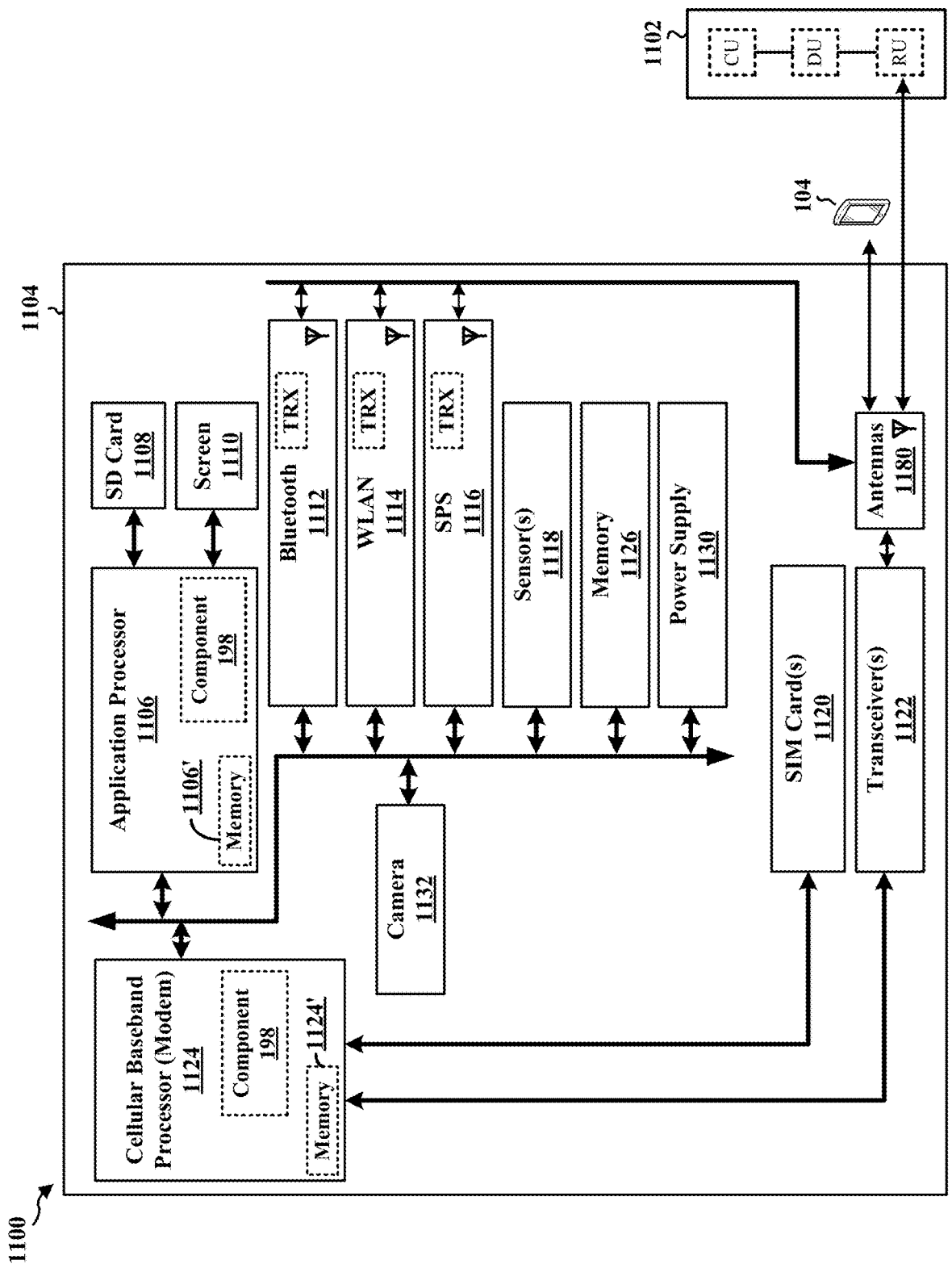
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the optical reference signal component 198 is configured to obtain at least one optical reference signal associated with a TRP, the at least one optical reference signal including at least one of: a TRP ID or direction information of the at least one optical reference signal with reference to the TRP, and identify information associated with the TRP with reference to the UE based on the at least one optical reference signal. The optical reference signal component 198 may be within the cellular baseband processor 1124, the application processor 1106, or both the cellular baseband processor 1124 and the application processor 1106. The optical reference signal component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for obtaining at least one optical reference signal associated with a TRP, the at least one optical reference signal including at least one of a TRP ID or direction information of the at least one optical reference signal with reference to the TRP, and means for identifying information associated with the TRP with reference to the UE based on the at least one optical reference signal. The apparatus 1104 includes means for performing at least one of a cell acquisition, a beam management, a UE position detection, a TRP validation, or an ambient environment detection based on the identified information associated with the TRP. The apparatus 1104 includes means for detecting a position of the UE with reference to the TRP based on one optical reference signal of the plurality of optical reference signals. The apparatus 1104 includes means for receiving the database from a network or a network node, means for detecting location information of the barcode with reference to the UE, and means for detecting the direction of the UE with reference to the TRP based on the barcode and location information of the barcode with reference to the UE. The apparatus 1104 includes means for receiving at least one reference radio signal, means for performing a beam detection based on the obtained at least one optical reference signal and the at least one reference radio signal, means for identifying a subset of beams from a plurality of beams based on the at least one reference radio signal, and means for identifying one beam from the subset of beams based on the at least one optical reference signal. The apparatus 1104 includes means for performing a cell acquisition based on the PCI of the TRP identified from the at least one optical reference signal. The apparatus 1104 includes means for receiving at least one reference radio signal, and means for detecting a position of the UE with reference to the TRP based on the at least one optical reference signal and the at least one reference radio signal. The apparatus 1104 includes means for receiving at least one reference radio signal indicating a cell ID of the TRP, and means for validating the TRP based on the cell ID of the TRP being associated with the TRP ID of the at least one optical reference signal. The apparatus 1104 includes means for transmitting, to the TRP, at least one of a strength or a pattern of the at least one optical reference signal, means for receiving at least one radio transmission impacting factor based on at least one of the strength or the pattern of the at least one optical reference signal, and means for managing radio propagation estimation based on the radio transmission impacting factor or at least one radio transmission impacting factor based on the radio communication environment status, and means for managing radio propagation estimation based on the radio communication environment status. The means may be the optical reference signal component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
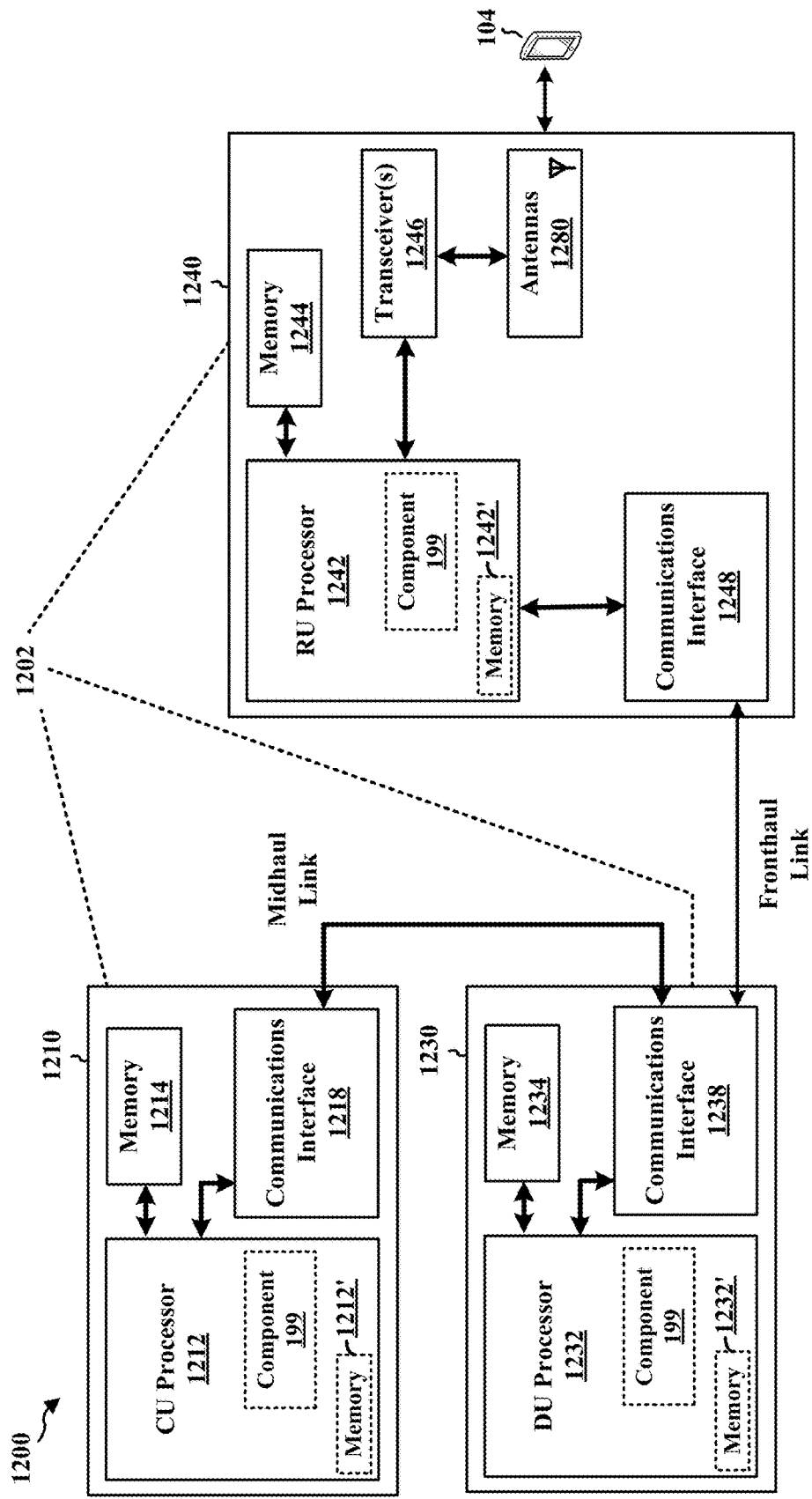
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the optical reference signal component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the optical reference signal component 199 is configured to transmit, for at least one UE, at least one optical reference signal including at least one of a TRP ID or direction information of the at least one optical reference signal with reference to the TRP, and receive information associated with the TRP with reference the at least one UE based on the at least one optical reference signal. The optical reference signal component 199 may be within one or more processors of one or more of the CU 1210, DU 1230, and the RU 1240. The optical reference signal component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for transmitting, for at least one UE, at least one optical reference signal including at least one of a TRP ID or direction information of the at least one optical reference signal with reference to the TRP, and means for receiving information associated with the TRP with reference the at least one UE based on the at least one optical reference signal. The network entity 1202 includes means for transmitting at least one reference radio signal. The network entity 1202 includes means for generating a radio communication environment status based on at least one of the strength or the pattern of the at least one optical reference signal, generate at least one radio transmission impacting factor based on the radio communication environment status, means for managing radio propagation estimation based on the radio communication environment status, and means for transmitting, for the at least one UE, the radio communication environment status or the at least one radio transmission impacting factor. The means may be the optical reference signal component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

Figure 13:
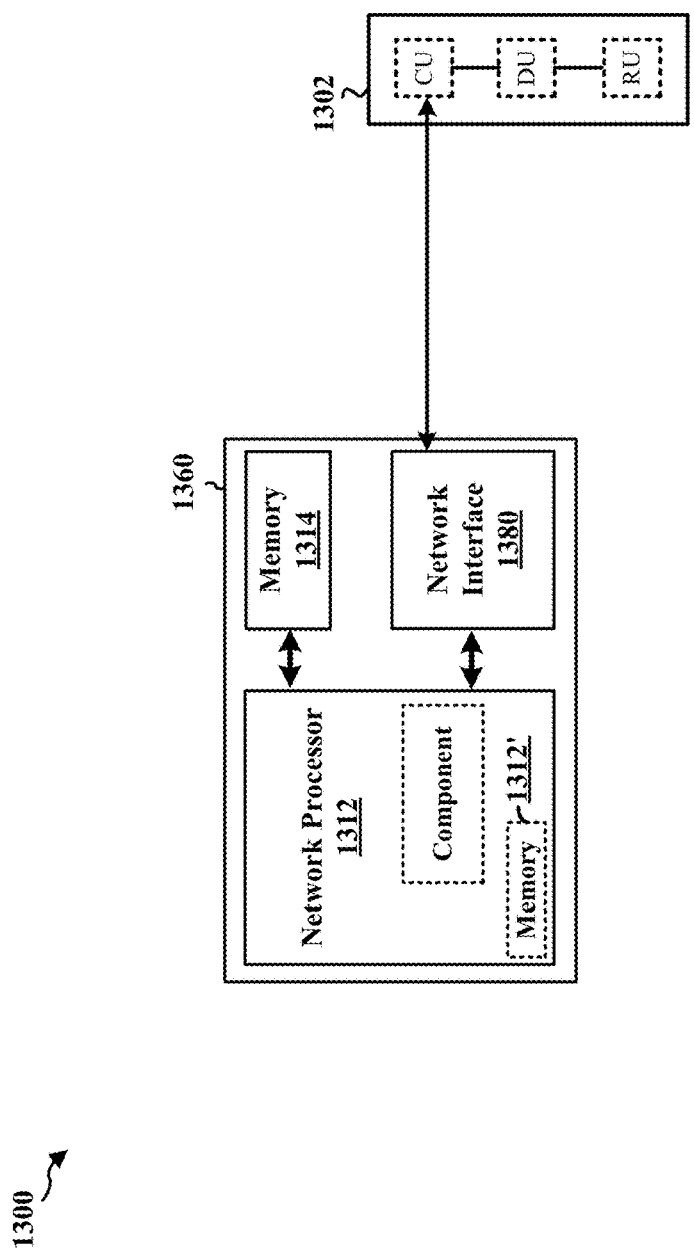
FIG. 13 is a diagram illustrating an example of a hardware implementation for an example network entity.

FIG. 13 is a diagram 1300 illustrating an example of a hardware implementation for a network entity 1360. In one example, the network entity 1360 may be within the core network 120. The network entity 1360 may include a network processor 1312. The network processor 1312 may include on-chip memory 1312'. In some aspects, the network entity 1360 may further include additional memory modules 1314. The network entity 1360 communicates via the network interface 1380 directly (e.g., backhaul link) or indirectly (e.g., through a RIC) with the CU 1302. The on-chip memory 1312' and the additional memory modules 1314 may each be considered a computer-readable medium/memory. Each computer-readable medium/memory may be non-transitory. The processor 1312 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the optical reference signal component 199 is configured to transmit, for at least one UE, at least one optical reference signal including at least one of a TRP ID or direction information of the at least one optical reference signal with reference to the TRP, and receive information associated with the TRP with reference the at least one UE based on the at least one optical reference signal. The optical reference signal component 199 may be within the processor 1312. The optical reference signal component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1360 may include a variety of components configured for various functions. In one configuration, the network entity 1360 includes means for transmitting, for at least one UE, at least one optical reference signal including at least one of a TRP ID or direction information of the at least one optical reference signal with reference to the TRP, and means for receiving information associated with the TRP with reference the at least one UE based on the at least one optical reference signal. The network entity 1360 includes means for transmitting at least one reference radio signal. The network entity 1360 includes means for generating a radio communication environment status based on at least one of the strength or the pattern of the at least one optical reference signal, generate at least one radio transmission impacting factor based on the radio communication environment status, means for managing radio propagation estimation based on the radio communication environment status, and means for transmitting, for the at least one UE, the radio communication environment status or the at least one radio transmission impacting factor. The means may be optical reference signal component 199 of the network entity 1360 configured to perform the functions recited by the means.

A TRP may be configured to transmit, for at least one UE, at least one optical reference signal including at least one of: a TRP identifier (ID) or direction information of the at least one optical reference signal with reference to the TRP and receive information associated with the TRP with reference the at least one UE based on the at least one optical reference signal. The UE may obtain at least one optical reference signal associated with the TRP, the at least one optical reference signal including at least one of: the TRP ID or direction information of the at least one optical reference signal with reference to the TRP, and identify information associated with the TRP with reference to the UE based on the at least one optical reference signal. The UE may also receive at least one reference radio signal, and use the correlation between the optical reference signal and the received reference radio signal.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device,"

and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including obtaining at least one optical reference signal associated with a TRP, the at least one optical reference signal including at least one of a TRP ID or direction information of the at least one optical reference signal with reference to the TRP, and identifying information associated with the TRP with reference to the UE based on the at least one optical reference signal.

Aspect 2 is the method of aspect 1, further including performing at least one of a cell acquisition, a beam management, a UE position detection, a TRP validation, or an ambient environment detection based on the identified information associated with the TRP.

Aspect 3 is the method of any of aspects 1 and 2, where the TRP ID is modulated using at least one of a binary light or a set of color light.

Aspect 4 is the method of any of aspects 1 to 3, where the at least one optical reference signal includes a plurality of optical reference signals cast in different directions, and the method further including detecting a position of the UE with reference to the TRP based on one optical reference signal of the plurality of optical reference signals.

Aspect 5 is the method of aspect 4, where each optical reference signal of the plurality of optical reference signals indicates the direction in which the optical reference signal is cast.

Aspect 6 is the method of any of aspects 1 to 5, where the at least one optical reference signal is associated with a barcode, and the at least one optical reference signal is obtained by scanning the barcode.

Aspect 7 is the method of aspect 6, where the barcode indicates the TRP ID.

Aspect 8 is the method of aspect 7, where the TRP ID of the TRP is identified based on a database including the barcode.

Aspect 9 is the method of aspect 8, further including receiving the database from a network or a network node.

Aspect 10 is the method of any of aspects 6 to 9, where the barcode indicates a direction of the TRP with reference to the barcode.

Aspect 11 is the method of aspect 10, further including detecting location information of the barcode with reference to the UE, and detecting the direction of the UE with reference to the TRP based on the barcode and location information of the barcode with reference to the UE.

Aspect 12 is the method of any of aspects 6 to 11, where the barcode includes a location, and the at least one processor is further configured to detect the TRP based on the location of the barcode.

Aspect 13 is the method of aspect 12, where a location of the detected TRP is identified based on a database including the location of the detected TRP.

Aspect 14 is the method of any of aspects 1 to 13, further including receiving at least one reference radio signal, and performing a beam detection based on the obtained at least one optical reference signal and the at least one reference radio signal.

Aspect 15 is the method of aspect 14, where performing the beam detection further includes identifying a subset of beams from a plurality of beams based on the at least one reference radio signal, and identifying one beam from the subset of beams based on the at least one optical reference signal.

Aspect 16 is the method of any of aspects 1 to 15, where the information associated with the TRP includes a PCI of the TRP, and the method further including performing a cell acquisition based on the PCI of the TRP identified from the at least one optical reference signal.

Aspect 17 is the method of any of aspects 1 to 16, further including receiving at least one reference radio signal, and detecting a position of the UE with reference to the TRP based on the at least one optical reference signal and the at least one reference radio signal.

Aspect 18 is the method of any of aspects 1 to 17, further including receiving at least one reference radio signal indicating a cell ID of the TRP, and validating the TRP based on the cell ID of the TRP being associated with the TRP ID of the at least one optical reference signal.

Aspect 19 is the method of any of aspects 1 to 18, further including transmitting, to the TRP, at least one of a strength or a pattern of the at least one optical reference signal, receiving at least one radio transmission impacting factor based on at least one of the strength or the pattern of the at least one optical reference signal, and managing radio propagation estimation based on the radio transmission impacting factor.

Aspect 20 is the method of aspect 19, where the radio propagation estimation is performed by an artificial intelligence or a machine-learning algorithm.

Aspect 21 is the method of any of aspects 1 to 20, further including transmitting at least one of a strength or a pattern of the at least one optical reference signal to the TRP, receiving a radio communication environment status from the TRP based on at least one of the strength or the pattern of the at least one optical reference signal, generating at least one radio transmission impacting factor based on the radio communication environment status, and managing radio propagation estimation based on the radio communication environment status.

Aspect 22 is an apparatus for wireless communication including at least one processor coupled to a memory and configured to implement any of aspects 1 to 21, further including a transceiver coupled to the at least one processor.

Aspect 23 is an apparatus for wireless communication including means for implementing any of aspects 1 to 21.

Aspect 24 is a non-transitory computer-readable medium storing computer executable code, where the code when executed by a processor causes the processor to implement any of aspects 1 to 21.

Aspect 25 is a method of wireless communication at a TRP, comprising transmitting, for at least one UE, at least one optical reference signal including at least one of a TRP ID or direction information of the at least one optical reference signal with reference to the TRP, and receiving information associated with the TRP with reference the at least one UE based on the at least one optical reference signal.

Aspect 26 is the method of aspect 25, where the at least one optical reference signal includes a plurality of optical reference signals cast in different directions.

Aspect 27 is the method of aspect 26, where each optical reference signal of the plurality of optical reference signals indicates the direction in which the optical reference signal is cast.

Aspect 28 is the method of any of aspects 25 to 27, further including transmitting at least one reference radio signal.

Aspect 29 is the method of aspect 28, where the information associated with the TRP with reference the at least one UE based on the at least one optical reference signal includes at least one of a strength or a pattern of the at least one optical reference signal, and the method further including generating a radio communication environment status based on at least one of the strength or the pattern of the at least one optical reference signal, generate at least one radio transmission impacting factor based on the radio communication environment status, and managing radio propagation estimation based on the radio communication environment status.

Aspect 30 is the method of aspect 29, where the radio propagation estimation is performed by an artificial intelligence or a machine-learning algorithm.

Aspect 31 is the method of aspect 29, further including transmitting, for the at least one UE, the radio communication environment status or the at least one radio transmission impacting factor.

Aspect 32 is an apparatus for wireless communication including at least one processor coupled to a memory and configured to implement any of aspects 25 to 31, further including a transceiver coupled to the at least one processor.

Aspect 33 is an apparatus for wireless communication including means for implementing any of aspects 25 to 31.

Aspect 34 is a non-transitory computer-readable medium storing computer executable code, where the code when executed by a processor causes the processor to implement any of aspects 25 to 31.

What is claimed is:

1. An apparatus for wireless communication at a user equipment (UE), comprising:
   memory; and
   at least one processor coupled to the memory and configured to:
   obtain, using an image capturing device at the UE, at least one optical reference signal from a light source at a transmit receive point (TRP), the at least one optical reference signal including at least one of: a TRP identifier (ID) or direction information of the at least one optical reference signal with reference to the TRP; and
   identify information associated with the TRP with reference to the UE based on the at least one optical reference signal, wherein the information associated with the TRP with reference to the UE comprises at least one of the TRP ID or the direction information of the at least one optical reference signal with reference to the TRP.

2. The apparatus of claim 1, further comprising a transceiver coupled to the at least one processor, wherein the at least one processor is further configured to:
   perform at least one of a cell acquisition, a beam management, a UE position detection, a TRP validation, or an ambient environment detection based on the identified information associated with the TRP.

3. The apparatus of claim 1, wherein the TRP ID is modulated using at least one of: a binary light or a set of color light.

4. The apparatus of claim 1, wherein the at least one optical reference signal includes a plurality of optical reference signals cast in different directions, and wherein the at least one processor is further configured to:
   detect a position of the UE with reference to the TRP based on one optical reference signal of the plurality of optical reference signals.

5. The apparatus of claim 4, wherein each optical reference signal of the plurality of optical reference signals indicates a direction in which the optical reference signal is cast.

6. The apparatus of claim 1, wherein the at least one optical reference signal is associated with a barcode, and wherein to obtain the at least one optical reference signal, the at least one processor is configured to obtain the at least one optical reference signal by scanning the barcode.

7. The apparatus of claim 6, wherein the barcode indicates the TRP ID.

8. The apparatus of claim 7, wherein the TRP ID of the TRP is identified based on a database including the barcode.

9. The apparatus of claim 8, wherein the at least one processor is further configured to download the database from a network or a network node.

10. The apparatus of claim 6, wherein the barcode indicates a direction of the TRP with reference to the barcode.

11. The apparatus of claim 10, wherein the at least one processor is further configured to:
    detect location information of the barcode with reference to the UE; and
    detect the direction of the UE with reference to the TRP based on the barcode and location information of the barcode with reference to the UE.

12. The apparatus of claim 6, wherein the barcode includes a location, and the at least one processor is further configured to detect the TRP based on the location of the barcode.

13. The apparatus of claim 12, wherein a location of the detected TRP is identified based on a database including the location of the detected TRP.

14. The apparatus of claim 1, wherein the at least one processor is further configured to:
    receive at least one reference radio signal; and
    perform a beam detection based on the obtained at least one optical reference signal and the at least one reference radio signal.

15. The apparatus of claim 14, wherein, to perform the beam detection, the at least one processor is configured to:
    identify a subset of beams from a plurality of beams based on the at least one reference radio signal; and
    identify one beam from the subset of beams based on the at least one optical reference signal.

16. The apparatus of claim 1, wherein the information associated with the TRP includes a physical cell ID (PCI) of the TRP, and wherein the at least one processor is further configured to:
    perform a cell acquisition based on the PCI of the TRP identified from the at least one optical reference signal.

17. The apparatus of claim 1, wherein the at least one processor is further configured to:
    receive at least one reference radio signal; and
    detect a position of the UE with reference to the TRP based on the at least one optical reference signal and the at least one reference radio signal.

18. The apparatus of claim 1, wherein the at least one processor is further configured to:
- receive at least one reference radio signal indicating a cell ID of the TRP; and
- validate the TRP based on the cell ID of the TRP being associated with the TRP ID of the at least one optical reference signal.

19. The apparatus of claim 1, wherein the at least one processor is further configured to:
- transmit at least one of a strength or a pattern of the at least one optical reference signal to the TRP;
- receive at least one radio transmission impacting factor based on at least one of the strength or the pattern of the at least one optical reference signal; and
- manage radio propagation estimation based on the radio transmission impacting factor.

20. The apparatus of claim 19, wherein the radio propagation estimation is performed by an artificial intelligence or a machine-learning algorithm.

21. The apparatus of claim 1, wherein the at least one processor is further configured to:
- transmit at least one of a strength or a pattern of the at least one optical reference signal to the TRP;
- receive a radio communication environment status from the TRP based on at least one of the strength or the pattern of the at least one optical reference signal;
- generate at least one radio transmission impacting factor based on the radio communication environment status; and
- manage radio propagation estimation based on the radio communication environment status.

22. An apparatus for wireless communication at a transmit receive point (TRP), comprising:
- memory; and
- at least one processor coupled to the memory and configured to:
  - transmit, to at least one user equipment (UE), via a light source, at least one optical reference signal associated with a barcode indicating at least one of: a TRP identifier (ID) or direction information of the at least one optical reference signal with reference to the TRP; and
  - receive information associated with the TRP with reference the at least one UE based on the at least one optical reference signal.

23. The apparatus of claim 22, wherein the at least one optical reference signal includes a plurality of optical reference signals cast in different directions.

24. The apparatus of claim 23, wherein each optical reference signal of the plurality of optical reference signals indicates a direction in which the optical reference signal is cast.

25. The apparatus of claim 22, wherein the at least one processor is further configured to transmit at least one reference radio signal.

26. The apparatus of claim 22, wherein the information associated with the TRP with reference the at least one UE based on the at least one optical reference signal includes at least one of a strength or a pattern of the at least one optical reference signal, wherein the at least one processor is further configured to:
- generate a radio communication environment status based on at least one of the strength or the pattern of the at least one optical reference signal;
- generate at least one radio transmission impacting factor based on the radio communication environment status; and
- manage radio propagation estimation based on the radio communication environment status.

27. The apparatus of claim 26, wherein the radio propagation estimation is performed by an artificial intelligence or a machine-learning algorithm.

28. The apparatus of claim 26, wherein the at least one processor is further configured to:
- transmit, for the at least one UE, the radio communication environment status or the at least one radio transmission impacting factor.

29. A method of wireless communication at a user equipment (UE), comprising:
- obtaining, using an image capturing device at the UE, at least one optical reference signal from a light source at a transmit receive point (TRP), the at least one optical reference signal including at least one of: a TRP identifier (ID) or direction information of the at least one optical reference signal with reference to the TRP; and
- identifying information associated with the TRP with reference to the UE based on the at least one optical reference signal, wherein the information associated with the TRP with reference to the UE comprises at least one of the TRP ID or the direction information of the at least one optical reference signal with reference to the TRP.

30. A method of wireless communication at a transmit receive point (TRP), comprising:
- transmitting, to at least one user equipment (UE), via a light source, at least one optical reference signal associated with a barcode indicating at least one of: a TRP identifier (ID) or direction information of the at least one optical reference signal with reference to the TRP; and
- receiving information associated with the TRP with reference the at least one UE based on the at least one optical reference signal.

* * * * *